United States Patent
Xue et al.

(10) Patent No.: US 9,723,630 B2
(45) Date of Patent: Aug. 1, 2017

(54) CONTENTION-BASED RESOURCE ALLOCATION METHOD AND APPARATUS FOR LOW POWER D2D COMMUNICATION

(71) Applicant: Samsung Electronics Co., Ltd., Gyeonggi-do (KR)

(72) Inventors: Peng Xue, Gyeonggi-do (KR); Seunghoon Park, Seoul (KR); Hyunseok Ryu, Gyeonggi-do (KR); Jeongho Park, Seoul (KR); Sangwon Choi, Gyeonggi-do (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 136 days.

(21) Appl. No.: 14/665,943

(22) Filed: Mar. 23, 2015

(65) Prior Publication Data
US 2015/0271786 A1    Sep. 24, 2015

(30) Foreign Application Priority Data

Mar. 21, 2014    (KR) .................. 10-2014-0033247
Sep. 25, 2014    (KR) .................. 10-2014-0128583

(51) Int. Cl.
*H04W 4/00* (2009.01)
*H04W 74/08* (2009.01)
*H04W 76/02* (2009.01)
*H04W 92/18* (2009.01)

(52) U.S. Cl.
CPC ...... *H04W 74/0816* (2013.01); *H04W 76/023* (2013.01); *H04W 92/18* (2013.01); *Y02B 60/50* (2013.01)

(58) Field of Classification Search
CPC ...................................................... H04W 72/04
USPC ........................................................ 370/329
See application file for complete search history.

(56) References Cited

U.S. PATENT DOCUMENTS

| | | | |
|---|---|---|---|
| 2013/0315152 A1* | 11/2013 | Ratasuk | H04W 76/023 370/329 |
| 2014/0119283 A1* | 5/2014 | Hwang | H04W 52/343 370/328 |
| 2014/0127991 A1* | 5/2014 | Lim | H04W 76/023 455/39 |
| 2014/0328306 A1* | 11/2014 | Gao | H04W 16/14 370/329 |
| 2015/0003310 A1* | 1/2015 | Ko | H04W 52/0225 370/311 |
| 2015/0016318 A1* | 1/2015 | Lee | H04L 5/14 370/280 |

(Continued)

OTHER PUBLICATIONS

International Search Report dated Jul. 3, 2015 in connection with International Application No. PCT/KR2015/002825; 3 pages.

(Continued)

*Primary Examiner* — Farah Faroul

(57) ABSTRACT

A contention-based resource allocation method and apparatus is provided for use in a low power Device-to-Device (D2D) communication. The resource allocation method of a Device-to-Device (D2D) terminal of the present disclosure includes selecting an available resource in a frame, monitoring to detect a signal is received while a backoff timer is running, and performing, when no signal is received on the available resource before expiry of the backoff timer, a D2D communication using the available resource.

18 Claims, 19 Drawing Sheets

(56) References Cited

U.S. PATENT DOCUMENTS

| | | | |
|---|---|---|---|
| 2015/0056987 A1* | 2/2015 | Li | H04W 76/023 |
| | | | 455/434 |
| 2015/0181406 A1* | 6/2015 | Seo | H04W 76/023 |
| | | | 370/329 |
| 2015/0208436 A1* | 7/2015 | Seok | H04W 74/08 |
| | | | 370/329 |
| 2015/0289282 A1* | 10/2015 | Phuyal | H04W 56/00 |
| | | | 370/329 |
| 2015/0327297 A1* | 11/2015 | Nilsson | H04W 72/1215 |
| | | | 370/336 |
| 2015/0334756 A1* | 11/2015 | Lu | H04W 76/023 |
| | | | 370/329 |
| 2015/0341878 A1* | 11/2015 | Lee | H04W 56/004 |
| | | | 370/329 |
| 2016/0105888 A1* | 4/2016 | Seok | H04W 16/10 |
| | | | 370/329 |
| 2016/0165637 A1* | 6/2016 | Kim | H04W 28/18 |
| | | | 370/329 |
| 2016/0192416 A1* | 6/2016 | Nagata | H04W 76/023 |
| | | | 370/329 |
| 2016/0197705 A1* | 7/2016 | Ryu | H04L 1/18 |
| | | | 370/242 |
| 2016/0234873 A1* | 8/2016 | Ryu | H04W 4/06 |
| 2016/0262142 A1* | 9/2016 | Nagata | H04W 8/005 |
| 2017/0034799 A1* | 2/2017 | Kim | H04W 56/00 |

OTHER PUBLICATIONS

Written Opinion of the International Searching Authority dated Jul. 3, 2015 in connection with International Application No. PCT/KR2015/002825; 6 pages.

Samsung; Resoruce Allocation for D2D Broadcast Communcation; R1-140390; 3GPP TSG RAN WG1 Mtg. #76; Prague, Czech Republic; Feb. 10-14, 2014; 5 pages.

Samsung; "Evaluation Results of Resource Allocation Schemes for D2D Communication"; R1-140389; 3GPP TSG RAN WG1 Mtg. #76; Prague, Czech Republic; Feb. 10-14, 2014; 4 pages.

Alcatel-Lucent Shanghai Bell, et al.; "Resource Allocation for D2D Communication"; R1-140174; 3GPP TSG RAN WG1 Mtg. #76; Prague, Czech Republic; Feb. 10-14, 2014; 6 pages.

ETRI; "Resource Allocation for D2D Comunications"; R1-140218; 3GPP TSG RAN WG1 Mtg. #76; Prague, Czech Republic; Feb. 10-14, 2014; 3 pages.

QUALCOMM Inc.; "Resource Allocation for in Network D2D Broadcast"; R1-140469; 3GPP TSG RAN WG1 Mtg. #76; Prague, Czech Republic; Feb. 10-14, 2014; 7 pages.

* cited by examiner

CONTENTION-BASED RESOURCE ALLOCATION METHOD AND APPARATUS FOR LOW POWER D2D COMMUNICATION

CROSS-REFERENCE TO RELATED APPLICATION AND CLAIM OF PRIORITY

The present application is related to and claims priority from and the benefit under 35 U.S.C. §119(a) of Korean Patent Application No. 10-2014-0033247, filed on Mar. 21, 2014, and Korean Patent Application No. 10-2014-0128583 filed Sep. 25, 2014, which are hereby incorporated by reference for all purposes as if fully set forth herein.

TECHNICAL FIELD

The present disclosure relates to a contention-based resource allocation method and apparatus for use in low power Device-to-Device (D2D) communication.

BACKGROUND

With the proliferation of smartphones, mobile data traffic is growing tremendously. By taking notice of the increase of the number of smartphone users and the ensuing proliferation of diverse application services such as Social Network Service (SNS) and games, it is expected that the mobile data traffic is growing faster than ever before. Furthermore, if, beyond the human-to-human communication, the human-to-machine and machine-to-machine communications are popularized, this is likely to increase traffic concentration to the base station to the extent uncontrollable.

There is therefore a need of the technologies for solving the problems, and the Device to Device (D2D) communication is one of such technologies. The D2D communication is a technique promising in both the licensed band communication system such as cellular system and unlicensed band communication system such as Wireless Local Area Network (WLAN).

In the mobile communication field, the D2D communication draws attention particularly in terms of increasing the traffic accommodation capacity of the base station. The D2D communication is advantageous in that, since the User Equipment (UE) located within the same cell or adjacent cells can establish a D2D connection to communicate data directly without involvement of the evolved Node B (eNB), the number of communication links decreases from 2 (UE1-eNB and eNB-UE2 likes) to 1 (UE-UE link).

The LTE-based D2D communication includes a D2D discovery phase and a D2D communication phase. The D2D discovery is a procedure for a UE to check the identities and interests of the neighboring UEs and advertise its identity and interest to the neighboring UEs. The identity and interest can be identified by a UE identifier (ID), an application identifier, or a service identifier depending on the D2D service and operation scenario.

The protocol stack of the UE consists of a D2D application layer, a D2D management layer, and a D2D transport layer. The D2D application layer is responsible for D2D application-specific services running on the Operating System (OS), D2D management layer for converting the discovery information generated by the D2D application services to a format suitable for the D2D transport layer, and the D2D transport layer corresponds to the Physical/Media Access Control (PHY/MAC) layer of LTE or Wi-Fi radio communication standard. The D2D discovery procedure can be performed as follows. When a D2D application is executed, the application layer generates the discovery information to the D2D management layer. The management layer converts the discovery information to a management layer message. The management layer message is transmitted by means of the transport layer, and the neighbor UE receives and processes the management message in the reverse order of transmission.

As aforementioned, the goal of the D2D communication is for the UEs to communicate data directly without any infrastructure such as eNB and Access Point (AS). The D2D communication can be performed based on the result of the D2D discovery procedure (with other UEs) or without discovery procedure. Whether the D2D discover procedure is required depends on the D2D service and operation scenario.

The D2D service scenarios are classified into a commercial service (or non-public safety service) and a public safety service. Examples of the services include advertisement, Social Network Service (SNS), gams, and public safety and emergency network service.

1) Advertisement: The network operator supporting the D2D communication allows the preregistered shops, cafés, theater, restaurants, etc. to their identities to the D2D users near around through D2D discovery and D2D communication procedures. The interest includes advertiser's promotion, event information, and discount coupon. When the identity matches the user's interest, the user visits the corresponding shop to obtain detailed information through the legacy cellular communication network or the D2D communication. In another example, a user discovers the taxis located around the user through the D2D discovery procedure and exchange data about user's destination and taxi fare through the legacy cellular communication or D2D communication.

2) Social Network Service (SNS): The user transmits the current application and application-specific interests to other users located near the user. The identity and interest for use in the D2D discovery includes application-specific friend list and application identifier. The user performs D2D discovery and then share the contents such as photos and motion pictures through the D2D communication.

3) Game: The user discovers the users and game applications to do a mobile game with other near users through the D2D discovery procedure and perform D2D communication for exchange game data.

4) Public safety service: The police and firefighters use the D2D communication technology for public security purpose. For example, in an emergency situation such as a fire, a landslide, or when the cellular communication is cut off due to the cellular network breakage caused by a natural disaster such as earthquake, volcano eruption, and tsunami, the police and firefighters use the D2D communication to discover the near colleagues and share emergency situation information with the near users.

The 3 GPP LTE D2D standardization is progressing in both the D2D discovery and D2D communication but different in standardization range. Both the D2D discovery and D2D communication are developed for the commercial use and have to be designed only in the network coverage. The D2D discovery does not support non-eNB environment or out of the eNB coverage. The D2D communication is developed for the public safety and emergency network service other than commercial service and has to support all the situations, such as in and out of network coverage and in the partial network coverage (communication in a situation where some UEs are located in the eNB coverage and other UEs out of the eNB coverage). In the public safety and emergency network service, it is required to perform the D2D communication without D2D discovery procedure.

Both the D2D discovery and D2D communication of the LTE D2D under the way of standardization are implemented in association with LTE uplink subframe. That is, a D2D transmitter transmits a D2D discovery signal and D2D communication data in the uplink subframe, and the D2D receiver receives the signal and data in the uplink subframe. In the current LTE system, since the UE receives data and control information from the eNB in downlink and transmits data and control information to the eNB in uplink, the D2D operation differs from the legacy LTE. For example, a UE that does not support D2D function has to have a receiver implemented based on Orthogonal Frequency Division Multiplexing (OFDM) for receiving downlink data and control information from the eNB and a transmitter implemented based on Single Carrier—Frequency Division Multiplexing (SC-FDM) for transmitting uplink data and control information to the eNB. However, the D2D UE has to have an SC-FDM receiver for receiving the D2D data and control information in uplink as well as the OFDM-based receiver for receiving downlink signal from the eNB and a SC-FDM transmitter for transmitting uplink data and control information to the eNB and D2D data and control information to the peer D2D UE because it has to support both the cellular mode and D2D mode.

The current LTE D2D specifies two types of D2D discovery schemes that are used selectively depending on the resource allocation method.

1) Type 1 discovery: The eNB broadcasts the information on the uplink resource pool available for D2D discovery through a System Information Block (SIB) in order for the UEs within the cell to receive. The size of the resource available for D2D communication (such as x consecutive subframes) and the resource periodicity (such as y seconds) are informed. When this information is received, the receiving D2D UEs select the resources to use in a distributed manner and transmit D2D discovery signals using the selected resources. Meanwhile, the receiving D2D devices have to receive all the D2D discovery signals transmitted in the resource pool indicated by the SIB.

2) Type 2 discovery: The eNB notifies the receiving D2D UEs of the resource pool for the discovery signals through the SIB. The discovery signal resource for the sending D2D UEs is scheduled by the eNB. At this time, the eNB performs the scheduling in a semi-persistent manner or a dynamic manner.

Like the D2D discovery procedure, the D2D communication procedure can be classified into two modes depending on the resource allocation type:

1) Mode 1: The base station notifies of the data transmission resource for D2D communication which the D2D transmitter used directly.

2) Mode 2: the eNB notifies of the resource pool which the D2D transmitter can use such that the UEs selects the resources in a distributed manner to transmit signal.

Another characteristic of the LTE-based D2D communication is that it aims the public safety scenario, unlike the cellular communication focused on unicast communication, to support broadcast-based communication. Accordingly, the LTE D2D communication does not support feedback such as channel measurement report and Hybrid Automatic Repeat Request Acknowledgement/Negative-acknowledgement (HARQ ACK/NACK). From this viewpoint, the pending question of the D2D broadcast communication is to providing highly reliable link quality for guaranteeing seamless D2D communication without assistance of eNB and any feedback. Particularly in the scenario where the UEs operate in a distributed manner with no assistance of eNB, it is important to solve to solve the resource collision problem caused by contention among the UEs for occupying the same resource.

As described above, since the D2D communication for the public safety network has to operate even in the situation without assistance of any eNB and the UEs participated in the D2D communication transmit no feedback, there is a need of a method capable of controlling the D2D resource efficiently among the UEs.

There are a few well-known resource allocation methods for D2D communication as follows.

The legacy Wi-Fi or ZIGBEE-based ad-hoc/sensor network uses Carrier Sense Multiple Access/Collision Avoid (CSMA-CA) as the basic contention-based resource access scheme without the concept of scheduling-based resource allocation. The CSMA-CA is characterized in that, when the number of UEs is small, the communication is performed in a way of suspending transmission to avoid collision without extra complex network management and thus used widely. However, it shows a drawback of significant data rate drop in the area where Wi-Fi users are concentrated so as to increase the user complaints and thus there is a need of enhanced method capable of substituting for the CSMA-CA.

Unlike the above-described D2D distributed resource access methods, the Time Division Multiple Access (TDMA) is the most efficient resource access scheme when a master node manages the resource. In the situation where a plurality of master nodes exist, however, there is a need of controlling resource allocation among the master nodes and this causes extra control signal overhead and delay. As a consequence, the TDMA is not suitable for the network expandable to cover a wide area such as D2D communication network.

FlashLinQ of QUALCOMM modifies the Request To Send (RTS) and Clear To Send (CTS) controls signals used in the CSMA-CA for access to the TCMA resource. It is known that the FlashLinQ shows performance increase as much as 5-fold compared to the Wi-Fi in a specific environment when applying the Signal-to-Interference Ratio (SIR) measured using the RTS and CTS to the terminal operating based on OFDM in the synchronized network.

Among the conventional technologies, the contention-based method such as CSMA-CA shows good extensibility but low efficiency, and the resource access method such as TDMA shows high efficiency but poor extensibility. The FlashLinQ, which has been conceived to solve these problems, introduces the slot concept as in the TDMA for efficiency and uses the round robin scheme for allocating slot resources.

The D2D broadcast communication for public safety network which is under discussion in the 3GPP is similar to Wi-Fi in that there is no need of connection setup and to FlashLinQ in that it operates on the licensed band and establishes synchronization between terminals.

There is therefore a need of a method for allocating D2D resource efficiently in the network area with assistance of base station while minimizing the collision probability in contention-based resource allocation in consideration of the D2D communication (or D2D broadcast) characteristics.

SUMMARY

To address the above-discussed deficiencies, it is a primary object to provide a method for allocating resources efficiently while minimizing access delay of the backoff operation for avoidance of collision by taking notice of the receiving terminal operating at low power especially when allocating resources to the sending terminal in a distributed manner. Also, the present disclosure aims to provide a method of signaling between the terminals that is capable of avoiding the collision in the backoff operation.

The present disclosure is applicable to the terminals operating out of the network coverage and in the partial network coverage. Also, the present disclosure is applicable to the terminal utilizing both the frames with and without a control region.

In accordance with an aspect of the present disclosure, a resource allocation method of a Device-to-Device (D2D) terminal is provided. The resource allocation method includes selecting an available resource in a frame, monitoring to detect a signal while a backoff timer is running, and performing, when no signal is received on the available resource before expiry of the backoff timer, D2D communication using the available resource.

In accordance with another aspect of the present disclosure, a terminal operating in Device-to-Device (D2D) communication mode is provided. The terminal includes a communication unit which is responsible for data communication and a control unit which selects an available resource in a frame, monitors to detect a signal while a backoff timer is running, and controls the communication unit to perform, when no signal is received on the available resource before expiry of the backoff timer, D2D communication using the available resource.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
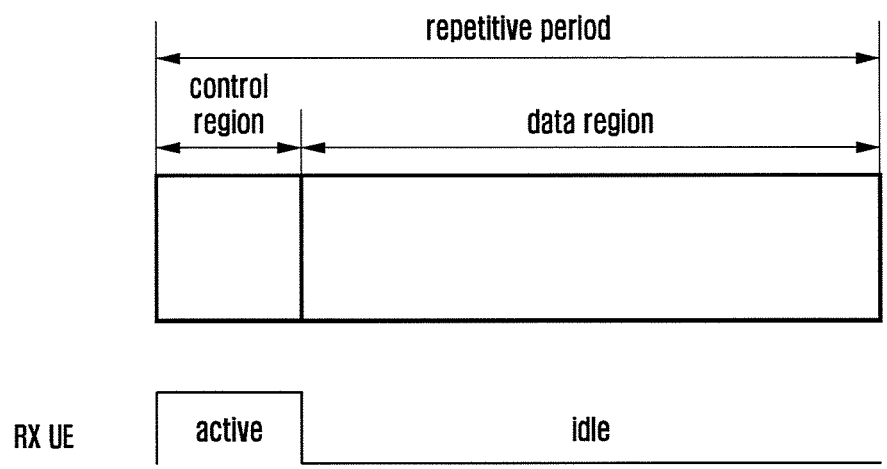
FIG. 1 illustrates the low power operation of the receiving UE in the frame including the control region according to various embodiments of the present disclosure.

FIGS. 1 through 19, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication device. The present disclosure is directed to the D2D broadcast but applicable to other types of radio communication with a slight modification without departing from the scope of the present disclosure. The present disclosure also can be applied to various types of broadcast-based services without limitation to the D2D broadcast.

The present disclosure can be implemented through a D2D UE. In certain embodiments of the present disclosure, the UE operates as a sending UE. Whether the UE operates as a sending UE or a receiving UE is determined according to the information from the eNB or a predetermined rule. In the following description, the terms 'sending and receiving UEs' are used interchangeably with the terms 'some UEs and other UEs,' 'terminal and another terminal,' and 'first group terminal and second group terminal.'

In the present disclosure, the D2D communication is performed in unit of frame as a basic unit. The frame is called repetitive period, repetitive cycle, and D2D frame. The term 'frame' is used in the same concept as specified in LTE and identical or not in structure and format. A frame is 20 ms or 40 ms on the time axis but without limitation thereto. The frame consists of a plurality of Resource Blocks (RBs) in the frequency domain. Referring to the LTE standard, the resource that a UE uses is counted in unit of Transmission Time Interval (TTI) and one TTI is 1 ms, which is identical with a subframe in time. In certain embodiments, assuming 5 RBs corresponds to one D2D RB, the UE uses one of 10 D2D RBs in one subframe.

The frame is comprised of a control region and a data region (shared region) (control-based access) or only the data region (distributed access).

The control region and the data region is notified to the UE by the eNB or predetermined for use out of the network to which the signal of the eNB does not reach. In certain embodiments, the control and data regions are the resources separated from each other or shared.

The frame structure is defined for convenience of explanation of the embodiments of the present disclosure, but the terms and structures related to one frame can be changed diversely without departing the spirit and scope of the present disclosure.

In certain embodiments of the present disclosure, the resource as the basic unit which the user selects for data transmission or reception are referred to as resource, radio resource, resource block, communication resource, D2D resource, etc. and the resource in the control region of the frame is referred to as control region and the resource in the data region as data resource.

The eNB controls and supports the resource allocation operation of the UE. Although the description is directed to the UE operation out of the network without control of the eNB, the present disclosure is also applicable in the network coverage where the eNB and the UE communicate or in the partial network coverage with slight modification without departing from the scope of the present disclosure. In various embodiments of the present disclosure, a UE acts as a role of a coordinator in the environment without eNB.

Exemplary embodiments of the present disclosure are described with reference to the accompanying drawings in detail. The same reference numbers are used throughout the drawings to refer to the same or like parts. Detailed description of well-known functions and structures incorporated herein are omitted to avoid obscuring the subject matter of the present disclosure. Further, the following teens are defined in consideration of the functionality in the present disclosure, and vary according to the intention of a user or an operator, usage, etc. Therefore, the definition should be made on the basis of the overall content of the present specification.

When no synchronization is established between the UEs, the receiving UE listens to the external signals to receive the data transmitted by the sending UE. In order to reduce power consumption, the UE operates in the active state during a period predetermined among the time-synchronized UEs and in the idle state during the remaining period with Low Duty Cycling. In order to support the low power operation, the sending UE transmits control signals and data signals in the active period of the receiving terminal and the remaining data signal subsequent to the previous in, control signal or initial data signal in the idle period.

FIG. 1 illustrates the low power operation of the receiving UE in the frame (repetitive period) including the control region according to various embodiments of the present disclosure. When the repetitive period is comprised of the control region and the data region as shown in FIG. 1, the receiving UE listens to signals in the control region and, when no control signal is detected, enters the idle state in the data region. When a control signal transmitted by a sending UE is detected in the control region, the receiving UE decodes the control signal and determines whether to receive the data corresponding to the control signal based on the information acquired from the control signal. When the data corresponding to the control signal is addressed to it, the receiving UE stays in the active state to receive the data in the data region.

Figure 2:
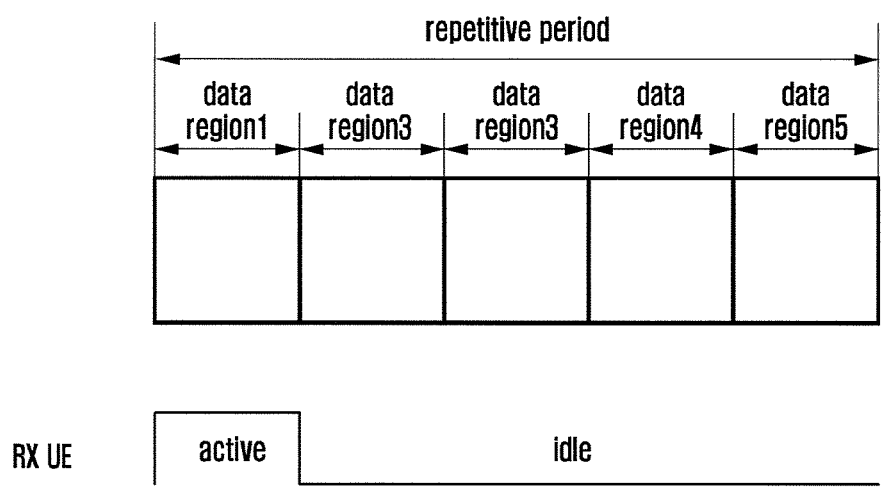
FIG. 2 illustrates the low power operation of the receiving UE in the frame with no control region according to various embodiments of the present disclosure.

FIG. 2 illustrates the low power operation of the receiving UE in the frame with no control region according to various embodiments of the present disclosure. When the repetitive period is composed of only the data region without any control region, the receiving UE listens during the data region 1 in the active state and, when no data signal is detected, enters and remains in the idle state during period of the data region 2 to data region 5. When a data signal transmitted by a sending UE is detected in the control region 1, the receiving UE receives the data signal. The receiving UE determines whether the data subsequent to the data signal is addressed to it based on the information contained in the data signal. The sending UE is preconfigured to transmit data repeatedly during the period of data region 1 to data region 5, and the receiving UE detects that the sending UE transmits data in the data regions 2 to 5 without extra control information. When it is determined that the subsequent data are addressed to the receiving UE based on the information contained in the first data signal, the receiving UE remains in the active state to receive the data signal during the rest data regions 1 to 5.

Although the following embodiments are applicable to the environments considering the repetitive periods with and without control region as shown in FIGS. 1 and 2, the description is made of one of the two environments of FIGS. 1 and 2 selectively in each embodiment for explanation convenience. Each of the following embodiments is applicable to both the environments of FIGS. 1 and 2.

A description is made of the normal transmission operation of the sending UE for the receiving UE operating in the low power mode.

Figure 3:
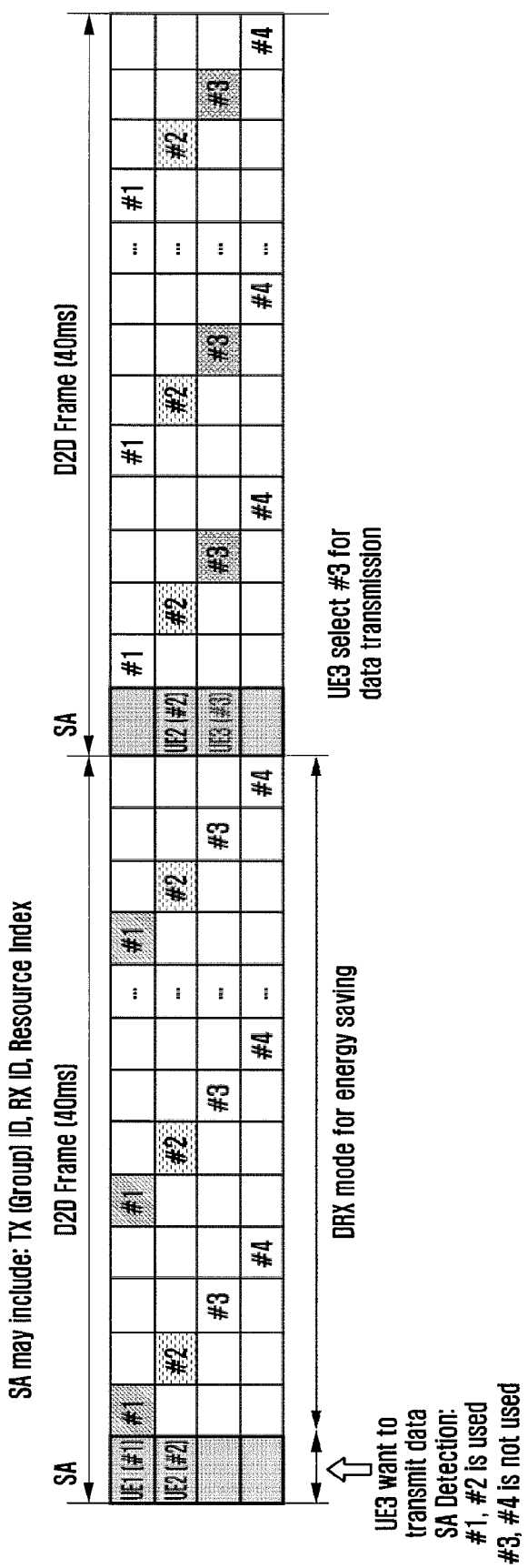
FIG. 3 illustrates a resource allocation method of a sending UE in the frame with a control region according to various embodiments of the present disclosure.

FIG. 3 illustrates a resource allocation method of a sending UE in the frame with a control region according to various embodiments of the present disclosure.

The D2D broadcast communication mode is designed mainly to support voice services. By taking notice of the Voice over IP (VoIP) packet period (20 ms or 40 ms), the repetitive D2D frame (frame or repetitive period) is set to 30 ms. The embodiments of the present disclosure are described based on the LTE standard. The resource that a UE uses is Transmission Time Interval (TTI), and one TTI corresponds to one subframe having the length of 1 ms.

The embodiment of FIG. 3 is directed to the case where the frame is comprised of a control region and a data region in the state that the D2D synchronization is established. The control and data regions are comprised of a plurality of D2D resource blocks in view of frequency domain. For example, in the LTE system with the whole uplink band which is divided into 50 basic Resource Blocks (RBs) and in which 5 basic RBs constitute one D2D RB in view of frequency domain, the UE uses one of total 10 D2D resource blocks of one subframe.

At least one sending UE transmits the control signal in the control region. In certain embodiments of the present disclosure, the control signal is the Scheduling Assignment (SA) control signal.

In FIG. 3, each of the UE1 and UE2 transmits one SA control signal and 3 data packets. The UE3 performs energy sensing in the control region of the first D2D frame and detects that resource #3 and resource #4 are empty. The UE3 selects the resource #3 between two empty resources to transmit the SA signal followed by data. The SA includes identification information (such as sending UE ID, receiving UE ID, and group ID) and a resource index for the data following the SA.

Figure 4:
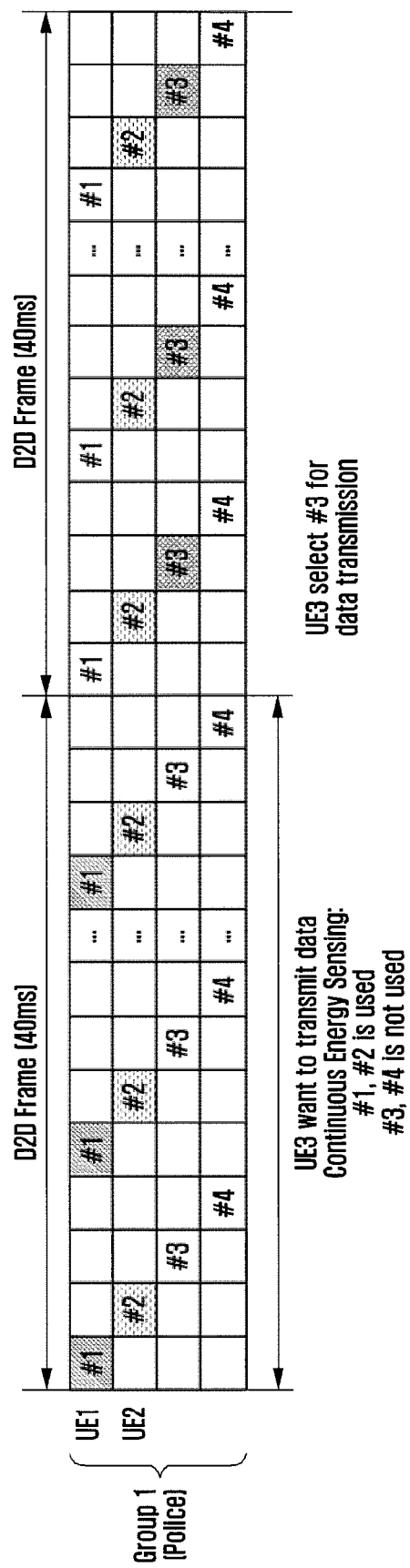
FIG. 4 illustrates a resource allocation method of a sending UE in the frame with no control region according to various embodiments of the present disclosure.

FIG. 4 illustrates a resource allocation method of a sending UE in the frame with no control region according to various embodiments of the present disclosure.

FIG. 4 is directed to the case where the frame has no control region in the state that the D2D synchronization is established. Each of the UE1 and UE2 transmits 3 data packets. The UE3 performs energy sensing in the first D2D frame and detects that resource #3 and resource #4 are empty. The UE3 selects the resource #3 between two empty resources of the second D2D frame to transmit data.

A description is made of the collision occurring in the transmission operation of FIGS. 3 and 4 hereinafter.

Figure 5:
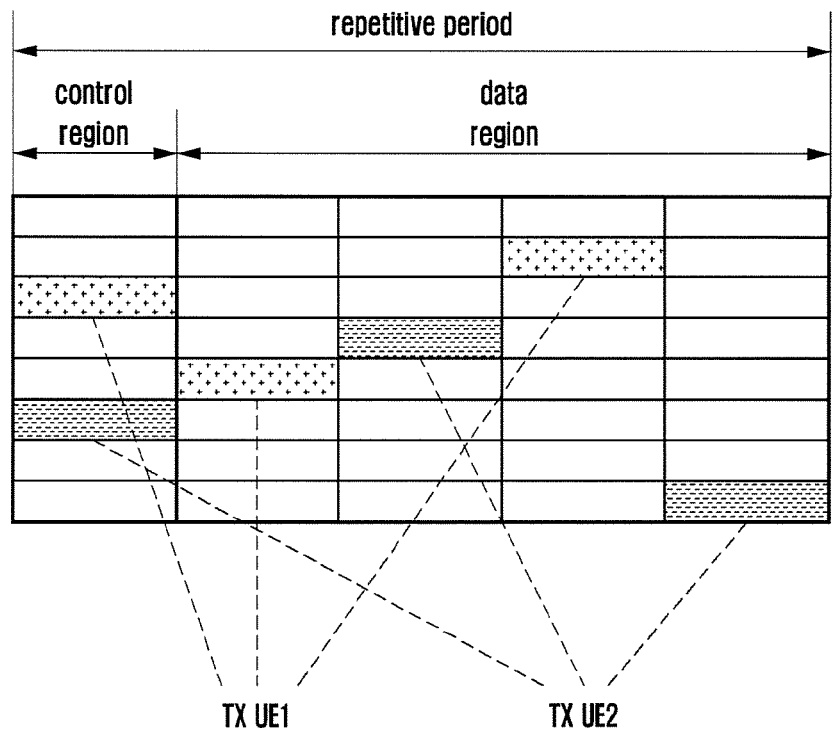
FIG. 5 illustrates a collision in the contention-based resource allocation method according to various embodiments of the present disclosure.
Figure 5:
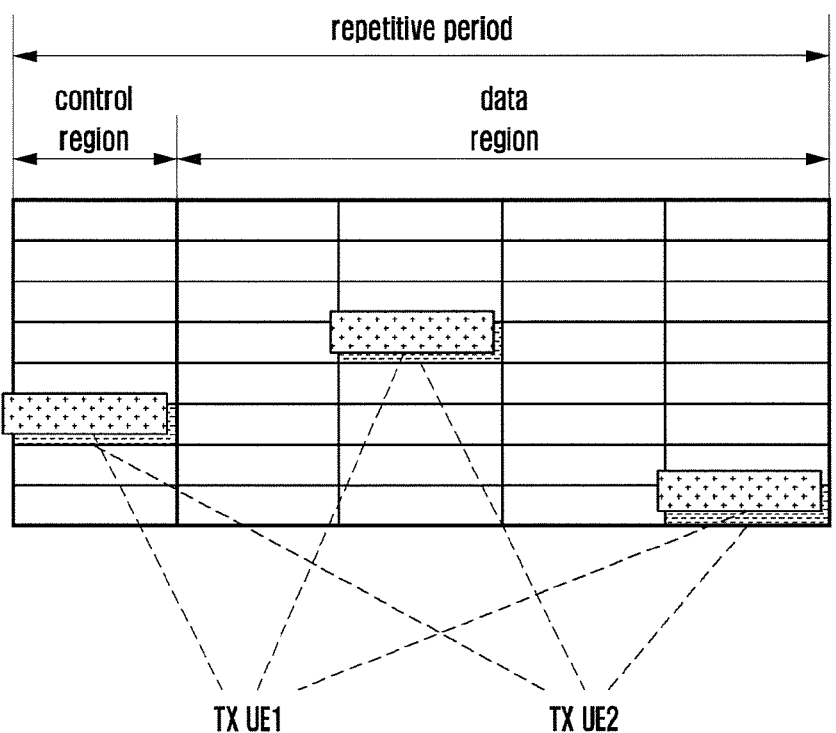

FIG. 5 illustrates a collision in the contention-based resource allocation method according to various embodiments of the present disclosure.

As described in the embodiments of FIGS. 3 and 4, the sending UE1 and the sending UE2 transmit the control signals using different control resources as depicted in the upper part of FIG. 5. In FIG. 5, the position of the data resource is predetermined depending on the position of the control resource. That is, when the control signals of the two UEs are transmitted on different control resources, the two UEs also transmit data on different data communication resources.

As shown in the lower part of FIG. 5, however, when the sending UE1 and the sending UE2 transmit the control signals on the same control resource, a collision is likely to occur in the data region as well as in the control region. When there is not feedback corresponding to the control signal in the D2D communication, there is no way of protecting against the collision using feedback information. Particularly since the control region is short in time for low power operation as compared to the data region, the collision probability increases as compared to the case where the whole data region is used for contention-based access.

In order to reduce the collision probability, the UE performs the backoff operation.

Figure 6:
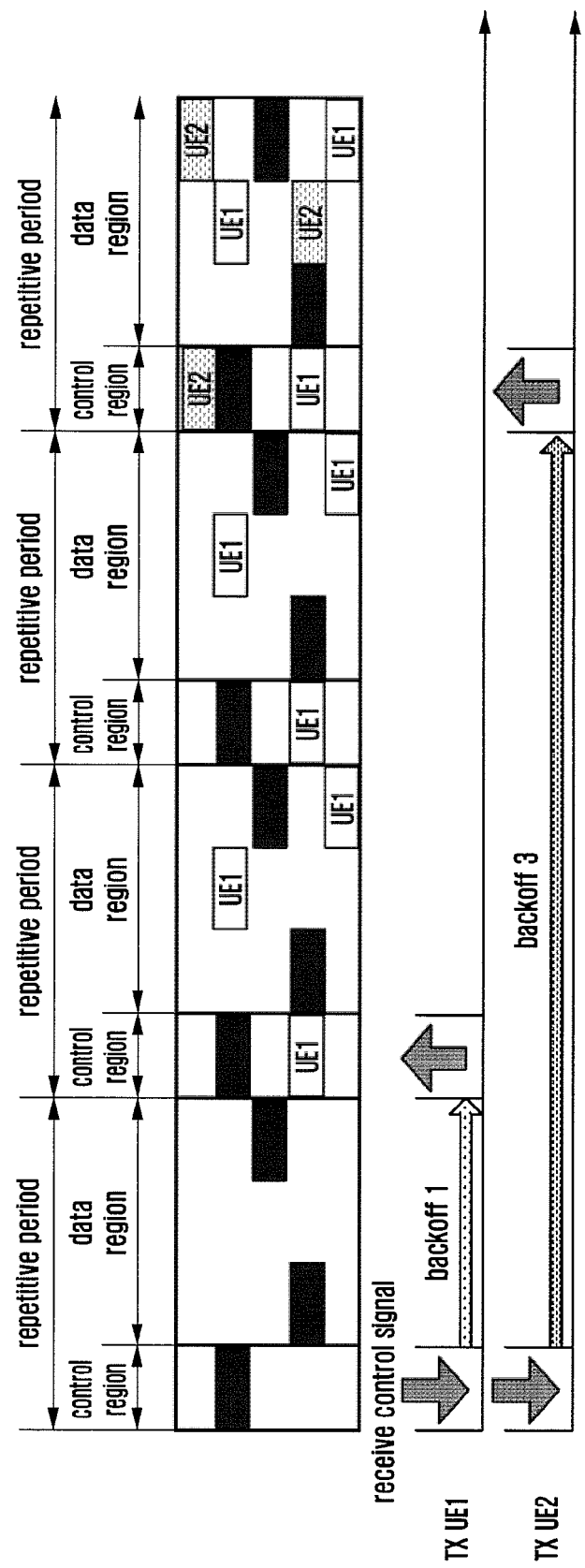
FIG. 6 illustrates the backoff operation of the sending UE according to various embodiments of the present disclosure.

FIG. 6 illustrates the backoff operation of the sending UE according to various embodiments of the present disclosure.

In order to decrease the collision probability in the D2D contention-based access procedure, the UE uses the backoff mechanism. When a UE transmits data, as in the embodiment of FIG. 5, the UE1 and UE2 receive the same control signal. When the UE1 and UE2 try to randomly select the resource on which no control signal is transmitted, such as an available resource, the UE1 and UE2 select the same resource, which incurs collision. In order to avoid a collision, the UE1 and UE2 set the backoff counters to different values such that each UE selects the available resource when its own backoff counter expires. In certain embodiments, the UE1 and UE2 select resource in different frames, resulting in reduction of collision probability.

FIG. 6 is directed to an exemplary case where the UE1 and UE2 set their backoff counters to 1 and 3 respectively to avoid collision.

The backoff operation of the UE is advantageous in terms of decreasing the collision probability but disadvantageous in terms of incurring access delay as much as the multiplication between the backoff counter and repetitive period.

The present disclosure provides a resource allocation method that is capable of minimizing the collision probability and access delay in the D2D contention-based resource access procedure.

Various embodiments of the present disclosure are applicable to when the region informations of the sending and receiving UEs match each other (synchronization is acquired) and the UEs operate based on the separate region informations (synchronization is not acquired). The descriptions are made of the case where the region informations of the sending and receiving UEs match and the case where the UEs operate with the respective region informations. When the region informations of the sending and receiving UEs match, the receiving UE are operating in the low power mode.

In the various embodiments of the present disclosure, the sending UE and the receiving UE are discriminated by the resource access operation. The voice service for the public safety network is mainly operating in a Push-To-Talk (PTT) mode and, when the sender pushes a button, the corresponding UE operates as the sending UE and the other UEs operate as receiving UEs.

The control signals proposed in the present disclosure include Scheduling Assignment (SA) and Reserve to Transmit (RT). The SA signal is used in the control region, and the RT signal in the data region. In certain embodiments, other control signals are used in the control region. For example, the control signal is a bi-directional signal such as Scheduling Request and Scheduling Response. The control signal is an other bi-directional signal such as Request to Send or Clear to Send. The control signal sends in the form of a sequence, a tone, or a message. In various embodiments of the present disclosure, the control signal is transmitted in the form of a message.

In certain embodiments, the communication is made with the frame spanning 40 ms as the basic resource unit. The term 'frame' is interchangeably used with the terms 'repetitive period,' 'repetitive duration,' and 'D2D frame.' Referring to the LTE standard, the resource that a UE uses is Transmission Time Interval (TTI), and one TTI corresponds to one subframe having the length of 1 ms.

The frame is comprised of a control region and a data region (shared region) (control-based access) or only the data region (distributed access).

The control region and the data region are notified to the UE by the eNB or predetermined for use out of the network to which the signal of the eNB does not reach. In certain embodiments, the control and data regions are separated resources or shared resource.

Typically in the distributed resource selection mode, the sending UE performs energy sensing to determine whether another sending UE occupies the resource and transmits data on unoccupied resource and, when multiple sending UEs occupy the same resource, whether this incurs collision. In order to decrease the collision probability, the sending UEs wait for different backoff times after the sensing operation and access the corresponding resource for use. In order to decrease the collision probability in the restricted control region, when the UEs transmit the control signals in different control regions, the resource allocation time delay is increased; and various embodiments of the present disclosure proposes a method of resolving the collision problem in the same repetitive period. Various embodiments of the present disclosure propose a signal transmission method that is capable of allowing at least one sending UE to select resources in the repetitive period and transmit the signal on the selected resource of the next repetitive period immediately.

The resource allocation method of the present disclosure includes checking, at the sending UE, the resource allocation statuses of other UEs through energy sensing in the control region or the first data region and performing contention-based resource allocation using the available resource in the data region which is not occupied by other UEs, based on the resource allocation status. The resource allocation method of the present disclosure is designed in consideration of both the scenarios: one scenario in which the time region in which the sending UE occupied the resource transmits the control signal or the first data signal matches the duration in which the receiving UEs is listening in the active state (region synchronization scenario) and the other scenario in which the time regions of the respective UEs mismatch (region non-synchronization scenario).

Figure 7:
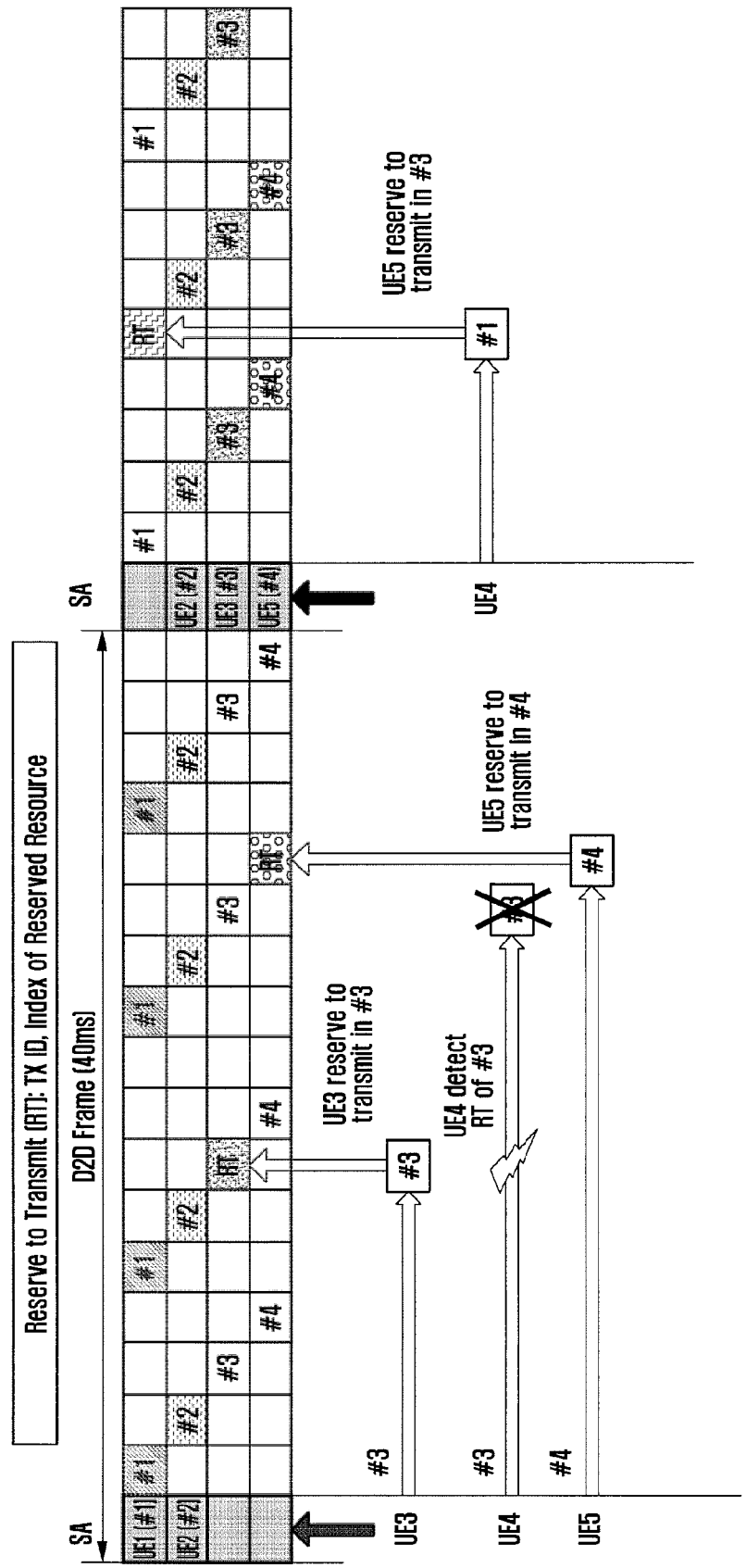
FIG. 7 illustrates a resource allocation method according to various embodiments of the present disclosure.

FIG. 7 illustrates a resource allocation method according to certain embodiments of the present disclosure.

Referring to FIG. 7, the UE3, UE4, and UE5 perform energy sensing in the first region of the frame, such as a control region (or first data region). When the UE1 and UE2 have occupied the resource transmit the control signal (SA) in the first region, the UE3, UE4, and UE5 detect the SA signals of the UE1 and UE2. The UE3, UE4, and UE5 check resources occupied by the UE1 and UE2 (data resource corresponding to control resource) based on the detected SA signals. The UE3, UE4, and UE5 check the resources occupied by the UE1 and UE2 based on the resource indices included in the SA signals in an explicit manner or based on the locations of the control resources indicated in the SA signals in an implicit manner.

The UE3, UE4, and UE5 check the resources not occupied by the UE1 and UE2 and select one of the available resources randomly. In FIG. 7, the UE3 and UE4 select the available resource #3, and the UE5 selects the available resource #4.

In the region subsequent to the first region of the repetitive period, the UE3, UE4, and UE5 transmit the RT signals using the resource corresponding to the available resources #3 or #4 to notify the neighboring UEs of the resource selection for occupancy. The UE3, UE4, and UE5 set the respective backoff timers to transmit the RT signals when the backoff timers expire.

The UE3, UE4, and UE5 perform energy sensing while the backoff timers (or backoff counters) are running. The UE3, UE4, and UE5 determine whether they win the contention for the selected resources depending on whether the RTs of other UEs are detected through energy sensing before the expires of the backoff timers.

In certain embodiments of FIG. 7, when the UE3 and UE4 select the same available resource #3, they contend for the available resource #3.

When contention occurs for the same resource as shown in FIG. 7, the UE, which has occupied the resource block corresponding to the resource index, wins the contention. When contention occurs for the same resource, the UE of which backoff timer expires first and which transmits the RT for the corresponding resource wins the contention and occupies the corresponding resource. Each UE performs energy sensing while its backoff timer is running, to sense the RT transmitted by another UE and, when the RT transmitted by another UE is detected on the selected resource, determines that it loses the contention or, otherwise, determines that it wins the contention.

In FIG. 7, when the UE3 has transmitted the RT signal for the resource #3, it wins the contention, and the UE4 loses the contention for the resource #3. The UE3 that has won the contention transmits data using the selected resource in the next repetitive period.

In the resource allocation method according to certain embodiments of the present disclosure, the UE4 which has lost the contention gives up the corresponding resource. Afterward, the UE4 performs the contention-based resource allocation operation to select the available resource #1.

In FIG. 7, when the UE5 does not detect the RT of other UEs while its backoff timer is running, it transmits data using the selected resource #4 in the next repetitive period.

Figure 8:
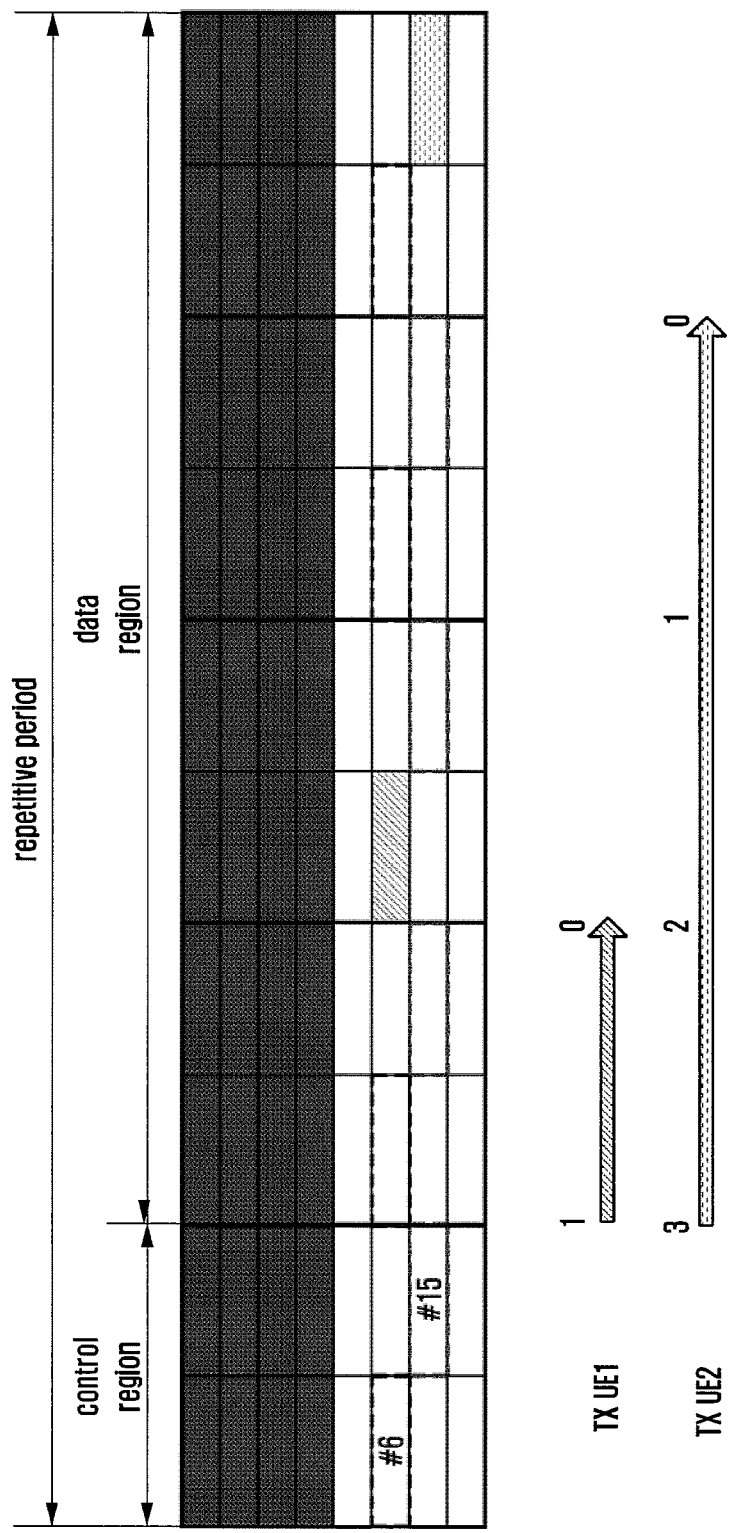
FIG. 8 illustrates the backoff operation using the time unit of frame for backoff according to various embodiments of the present disclosure.

FIG. 8 illustrates the backoff operation using the time unit of frame for backoff according to various embodiments of the present disclosure.

In an exemplary backoff operation, the time unit for backoff is the resource block in the resource indicated by the selected resource index. In certain embodiments, the UE decreases the backoff timer by 1 at every resource block as shown in FIG. 8.

For example, the UE3 determines the resource index for use in the sensing period, sets the backoff timer to 2, and decreases, when the first available resource block arrives in the resource #3, the backoff timer to 1. When the second available resource block arrives, the UE3 decreases the backoff timer to 0. When the backoff timer reaches 0, the UE3 transmits the RT signal.

The backoff timer is set across one or more D2D frames. Since the backoff timer decreases by one per available resource block, when another UE preoccupies the corresponding resource, the UE pauses the decrease of the backoff timer for the preoccupied resource and, when the corresponding resource is withdrawn, resumes the decrease of the backoff timer.

Figure 9:
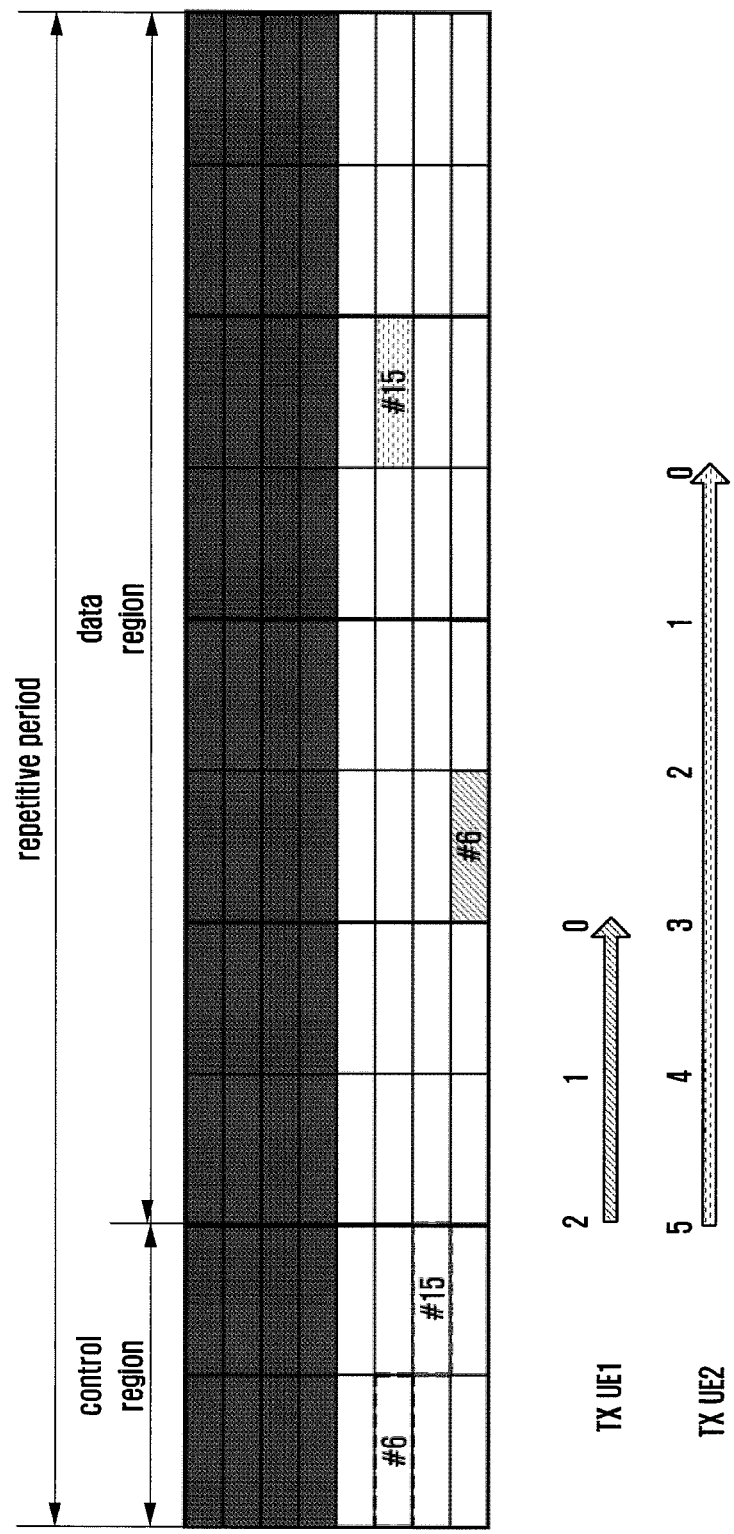
FIG. 9 illustrates the backoff operation using the time unit of subframe for backoff according to various embodiments of the present disclosure.

FIG. 9 illustrates the backoff operation using the time unit of subframe for backoff according to various embodiments of the present disclosure.

In an exemplary backoff operation, the time unit for backoff is a subframe. In certain embodiments, the UE decreases the backoff timer by one per subframe as shown in FIG. 9.

Although the UE transmits the RT signal on the whole available resource in the subframe, the actual resource location is not determined according to the location of RT transmission and thus the resource index is transmitted explicitly in the RT signal. The backoff timer determined after the sensing period decreases by 1 at ever subframe.

When all of the resource indices are in use based on the preoccupied resource indices and the resource indices contained in the RT signals of other sending UEs, the UE pauses decreasing the backoff time until the resource indices are withdrawn.

Figure 10:
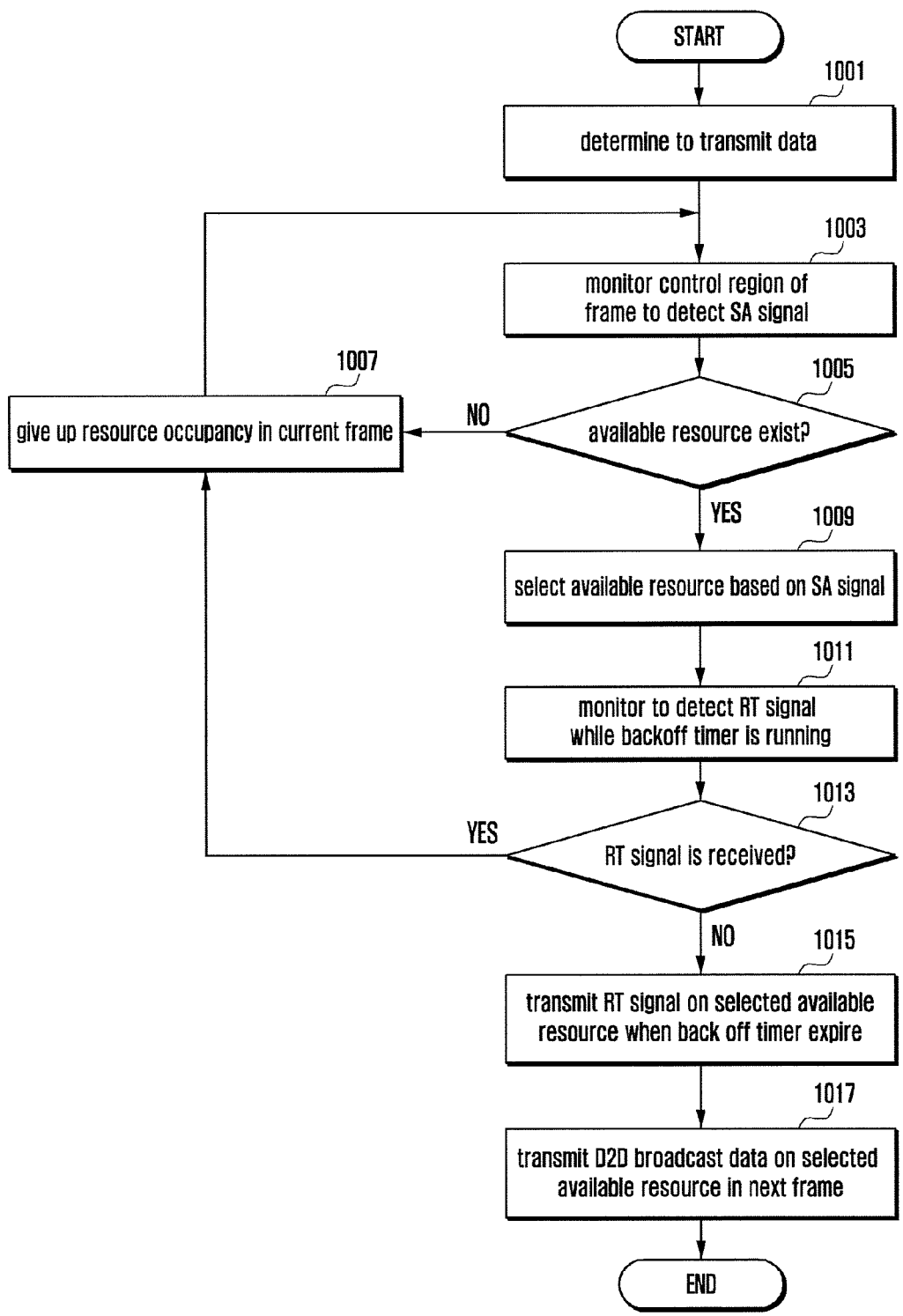
FIG. 10 illustrates the resource allocation method according to various embodiments of the present disclosure.

FIG. 10 illustrates the resource allocation method according to various embodiments of the present disclosure.

In step 1001, the UE determines to transmit data.

In step 1003, the UE monitors the first region, such as a control region or first data region of the current frame, to detect neighbors' signals. The neighbor's signal is a control signal, particularly SA signal.

In step 1005, the UE determines whether any resource is available in the current frame based on the detected SA signals.

In step 1007, when no resource is available, such as when the whole resource is occupied by other UEs as the result of the SA signal monitoring, the UE gives up the corresponding resource in the current frame.

In step 1009, when any resource is available, the UE selects certain available resource.

In step 1011, the UE sets and starts a backoff timer. The UE continues monitoring to detect the neighbors' signals (energy sensing) while the backoff timer is running. The neighbor's signal is the RT signal. The UE decreases the backoff timer by one per time unit.

In step 1013, when an RT signal for the resource selected by the UE is received before the expiry of the backoff timer, the UE determines that it has lost the contention for the resource and gives up the corresponding resource in the current frame at step 1007.

In step 1015, when no RT signal for the selected resource is received before the expiry of the backoff timer at step 1013, the UE transmits the RT signal on the selected available resource.

In step 1017, the UE transmits the D2D broadcast data on the selected available resource in the next frame.

Figure 11:
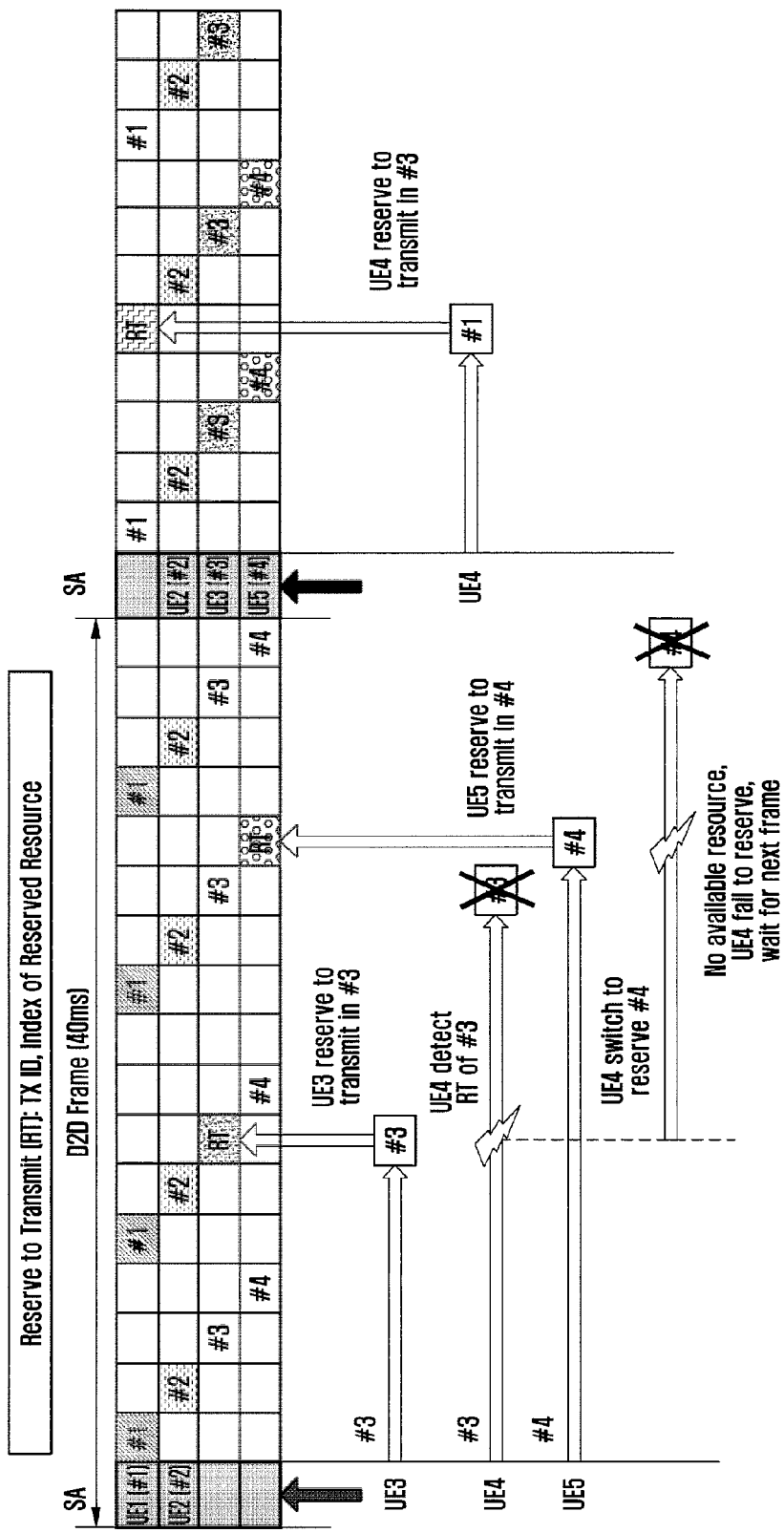
FIG. 11 illustrates a resource allocation method according to various embodiment of the present disclosure.

FIG. 11 illustrates a resource allocation method according to various embodiments of the present disclosure.

Referring to FIG. 11, the UE3, UE4, and UE5 perform energy sensing in the first region of the frame, such as a control region or first data region. When the UE1 and UE2, which have occupied the resource, transmit the control signal (SA) in the first region, the UE3, UE4, and UE5 detect the SA signals of the UE1 and UE2. The UE3, UE4, and UE5 check resources occupied by the UE1 and UE2 (data resource corresponding to control resource) based on the detected SA signals. The UE3, UE4, and UE5 check the resources occupied by the UE1 and UE2 based on the resource indices included in the SA signals in an explicit manner or based on the locations of the control resources indicated in the SA signals in an implicit manner.

The UE3, UE4, and UE5 check the resources not occupied by the UE1 and UE2 and select one of the available resources randomly. In FIG. 11, the UE3 and UE4 select the available resource #3, and the UE5 selects the available resource #4.

In the region subsequent to the first region of the repetitive period, the UE3, UE4, and UE5 transmit the RT signals using the resource corresponding to the available resources #3 or #4 to notify the neighboring UEs of the resource selection for occupancy. The UE3, UE4, and UE5 set the respective backoff timers to transmit the RT signals when the backoff timers expire.

The UE3, UE4, and UE5 perform energy sensing while the backoff timers (or backoff counters) are running. The UE3, UE4, and UE5 determine whether they win the contention for the selected resources depending on whether the RTs of other UEs are detected through energy sensing before the expires of the backoff timers.

In the embodiment of FIG. 11, since the UE3 and UE4 select the same available resource #3, they contend for the available resource #3.

When contention occurs for the same resource as shown in FIG. 11, the UE which has occupied the resource block corresponding to the resource index wins the contention. When contention occurs for the same resource, the UE of which backoff timer expires first and thus which transmits the RT for the corresponding resource wins the contention and occupies the corresponding resource. Each UE performs s energy sensing, while its backoff timer is running, to sense the RT transmitted by another UE and, when the RT transmitted by another UE is detected on the selected resource, determines that it loses the contention or, otherwise, determines that it wins the contention.

In FIG. 11, when the UE3 has transmitted the RT signal for the resource #3, it wins the contention, and the UE4 loses the contention for the resource #3. The UE3 which has won the contention transmits data using the selected resource in the next repetitive period.

In the resource allocation method according to certain embodiments of the present disclosure, the UE4, which has lost the contention, selects another available resource index at the corresponding time point to resume the backoff operation. The UE4 selects the resource #4 as another available resource to resume the backoff operation. The backoff timer decreases as before or be reset to a new timer value.

In certain embodiments of FIG. 11, the UE4 selects another available resource index #4 newly to perform the backoff timer reduction operation.

In certain embodiments, the UE4 contends with the UE5 for the newly selected resource #4. When the backoff timer of the UE5 expires before the expiry of the backoff timer of the UE4 and thus the UE5 transmits RT, the UE4 loses the contention for the resource #4. When no more resources are available, the UE4 stops contention operation in the current repetitive period. The UE4 performs the competitive resource allocation operation in the next repetitive period to select the available resource #1.

In FIG. 11, when no RT from other UE is detected while the backoff timer of the UE5 is running, the UE5 transmits data using the selected resource #4 in the next repetitive period.

Figure 12:
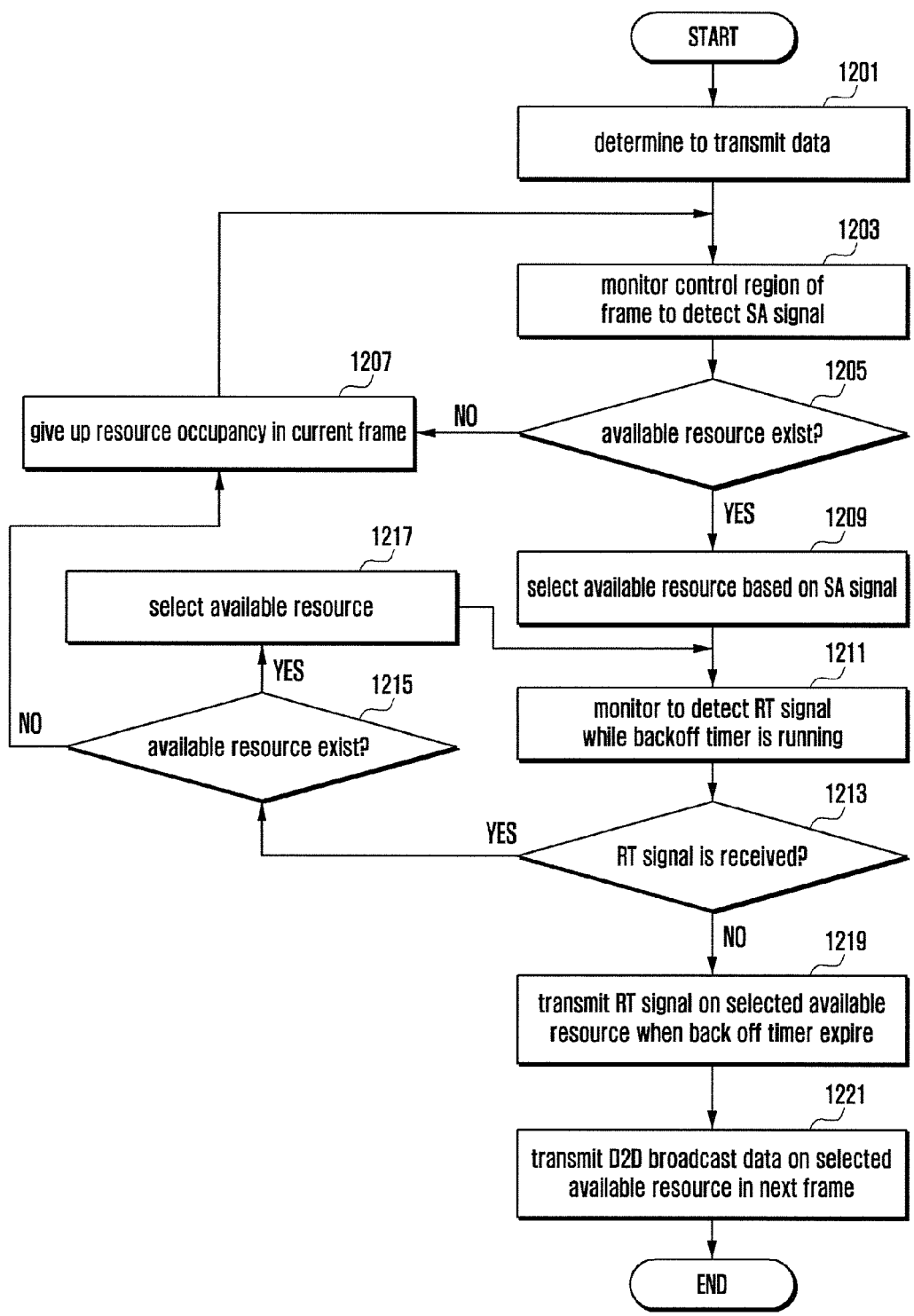
FIG. 12 illustrates the resource allocation method according to various embodiments of the present disclosure.

FIG. 12 illustrates the resource allocation method according to various embodiments of the present disclosure.

In step 1201, the UE determines to transmit data.

In step 1203, the UE monitors the first region, such as a control region or first data region of the current frame, to detect neighbors' signals. The neighbor's signal is a control signal, particularly an SA signal.

In step 1205, the UE determines whether any resource is available in the current frame based on the detected SA signals.

In step 1207, when no resource is available, such as when the whole resource is occupied by other UEs as the result of the SA signal monitoring, the UE gives up resource occupancy in the current frame.

In step 1209, when any resource is available, the UE selects certain available resource.

In step 1211, the UE sets and starts a backoff timer. The UE continues monitoring to detect the neighbors' signals (energy sensing) while the backoff timer is running. The neighbor's signal is the RT signal. The UE decreases the backoff timer by one per time unit.

In step 1213, when the RT signal for the selected resource is received before the expiry of the backoff timer, the UE detects that it has lost the resource allocation contention and determines whether there is further available resource at step 1215.

In step 1215, when no further resource is available, the UE gives up the corresponding resource in the current frame at step 1207.

In step 1217, when a further resource is available, the UE selects part of the available resource.

The UE repeats steps 1211 to 1217 until the backoff timer expires.

In step 1219, when no RT signal for the selected resource is received before expiry of the backoff timer at step 1213, the UE transmits the RT signal on the selected resource upon expiry of the backoff timer.

In step 1221, the UE transmits the D2D broadcast data on the selected available resource in the next frame.

Figure 13:
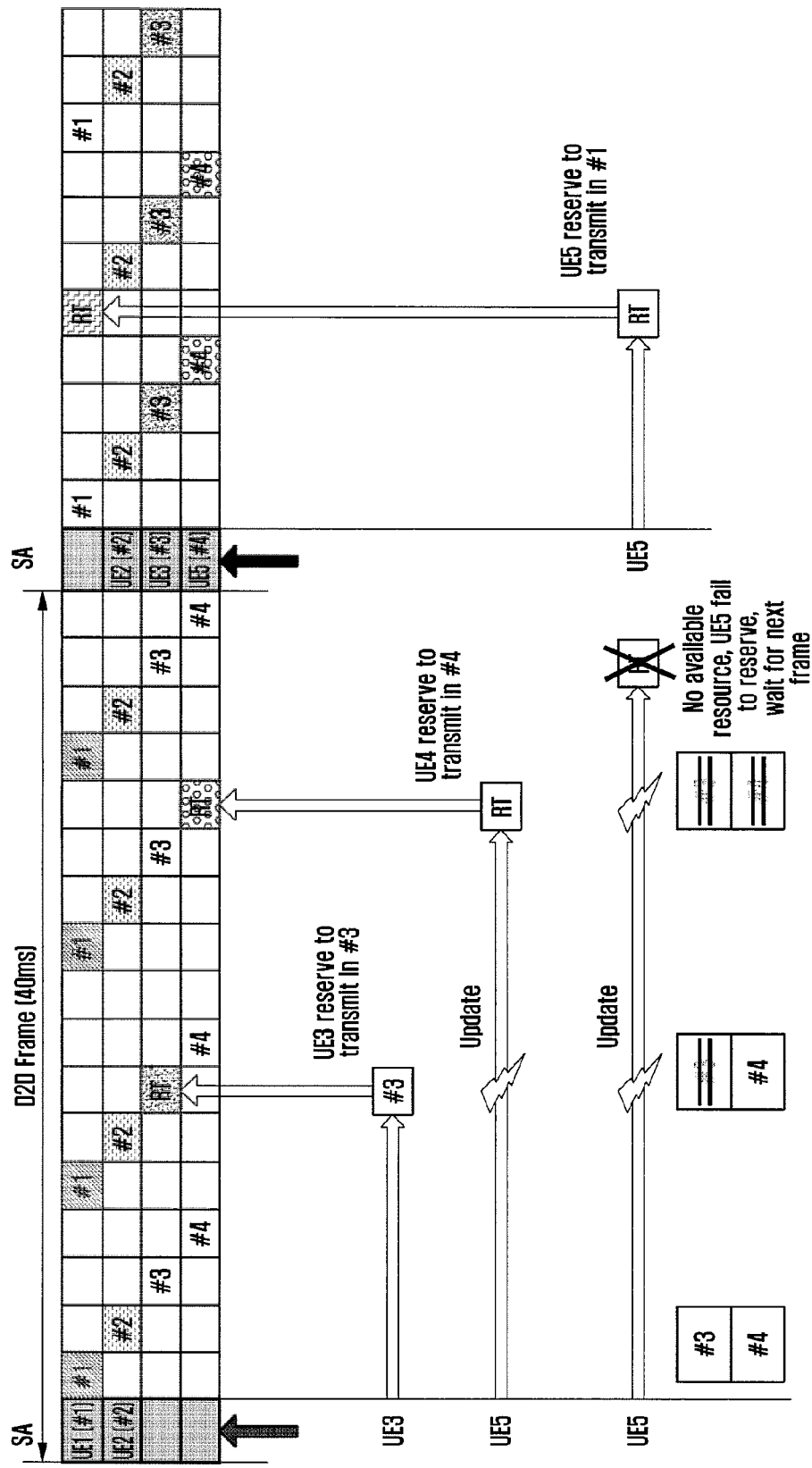
FIG. 13 illustrates the resource allocation method according to various embodiments of the present disclosure.

FIG. 13 illustrates the resource allocation method according to various embodiments of the present disclosure.

Referring to FIG. 13, the UE3, UE4, and UE5 perform energy sensing in the first region of the frame, such as a control region or first data region. In FIG. 13, when the UE1 and UE2 which have occupied the resource transmit the control signal (SA) in the first region, the UE3, UE4, and UE5 detect the SA signals of the UE1 and UE2. The UE3, UE4, and UE5 check resources occupied by the UE1 and UE2 (data resource corresponding to control resource) based on the detected SA signals. The UE3, UE4, and UE5 check the resources occupied by the UE1 and UE2 based on the resource indices included in the SA signals in an explicit manner or based on the locations of the control resources indicated in the SA signals in an implicit manner.

In certain embodiments of the present disclosure, the UE3, UE4, and UE5 check the resources not occupied by the UE1 and UE2, such as available resources, and generate a list including the available resources #3 and #4.

Next, the UE3, UE4, and UE5 set backoff timers which decrease by time unit and, when the backoff timer reaches 0, transmit the RT signals. Each of the UE3, UE4, and UE5 selects one of the available resources listed in the list to transmit the RT signal on the corresponding resource when its backoff timer expires.

Each of the UE3, UE4, and UE5 continues energy sensing while its backoff timer or backoff counter is running. Each of the UE3, UE4, and UE5 determines whether an RT transmitted by another UE is detected before the expiry of its backoff timer. When any RT is received, the UE determines that the corresponding resource has been occupied by another sending UE and removes the index of the resource preoccupied by another UE from the available resource list. When all the available resource indices are removed from the list, such as when no further resource is available, the UE pauses its backoff timer until any available resource index is withdrawn. The subsequent operations are identical with those as described in the first and second embodiments.

Figure 14:
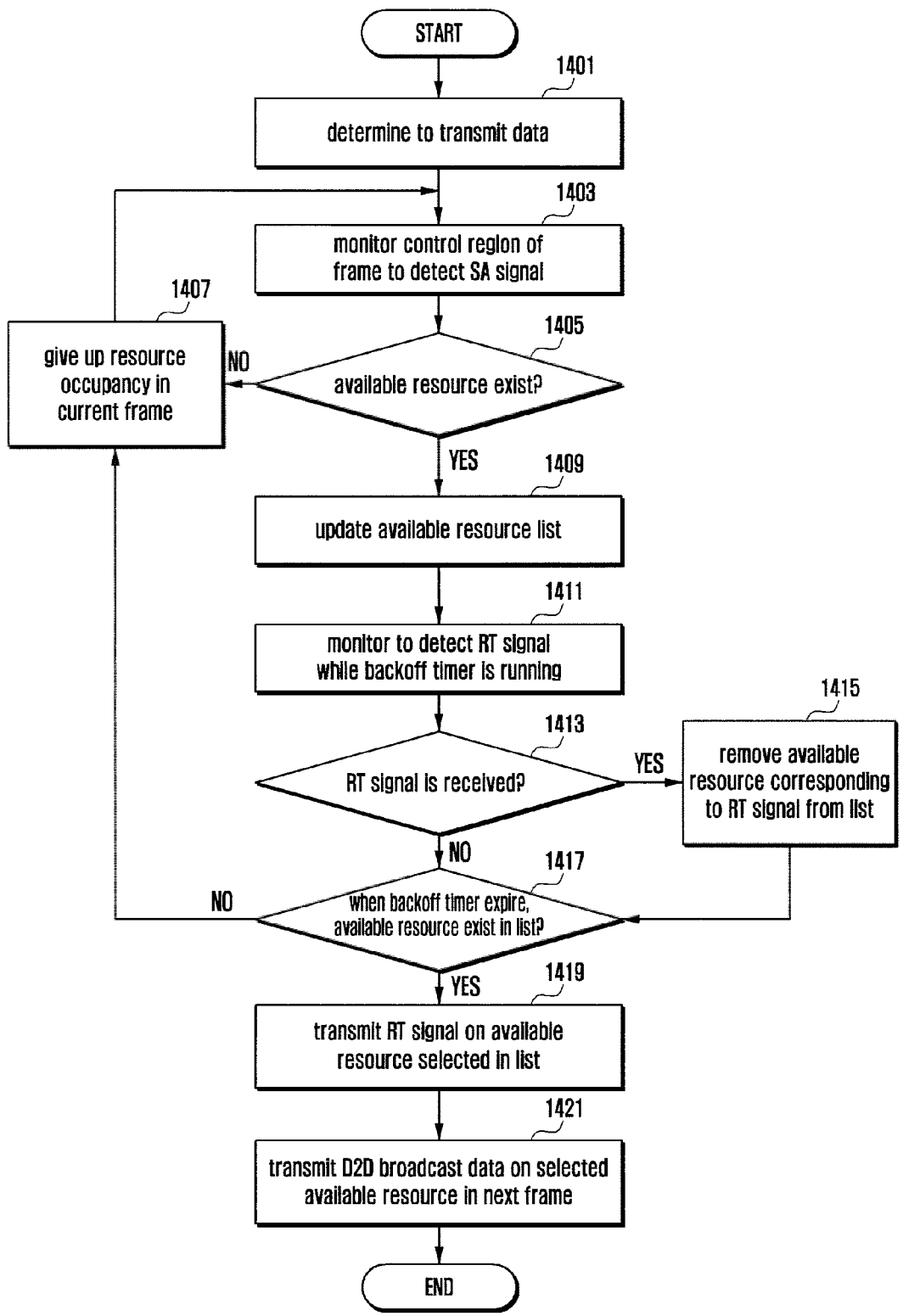
FIG. 14 illustrates the resource allocation method according to various embodiments of the present disclosure.

FIG. 14 illustrates the resource allocation method according to certain embodiments of the present disclosure.

In step 1401, the UE determines to transmit data.

In step 1403, the UE monitors the first region, such as a control region or first data region of the current frame, to detect neighbors' signals. The neighbor's signal is a control signal, particularly SA signal.

In step 1205, the UE determines whether any resource is available in the current frame based on the detected SA signals.

In step 1407, when no resource is available, such as when the whole resource is occupied by other UEs as the result of the SA signal monitoring, the UE gives up the corresponding resource in the current frame.

In step 1409, when any resource is available, the UE updates an available resource list by adding the available resources thereto.

In step 1411, the UE sets and starts a backoff timer. The UE continues monitoring to detect the neighbors' signals (energy sensing) while the backoff timer is running. The neighbor's signal is the RT signal. The UE decreases the backoff timer by one per time unit.

In step 1413, when the RT signal for the selected resource is received before the expiry of the backoff timer, the UE removes the available resource corresponding to the RT signal from the available resource list at step 1415. The UE repeats the above operation until the backoff timer expires.

In step 1417, the UE determines whether any available resource is remaining without being removed from the available resource list.

When no available resource remains in the available resource list, the UE determines it has lost the resource allocation contention and gives up the corresponding resource in the current frame at step 1407.

In step 1419, when any available resource remains in the available resource list, the UE transmits the RT signal on the available resource selected in the list.

In step 1421, the UE transmits D2D broadcast data using the selected available resource in the next frame.

Figure 15:
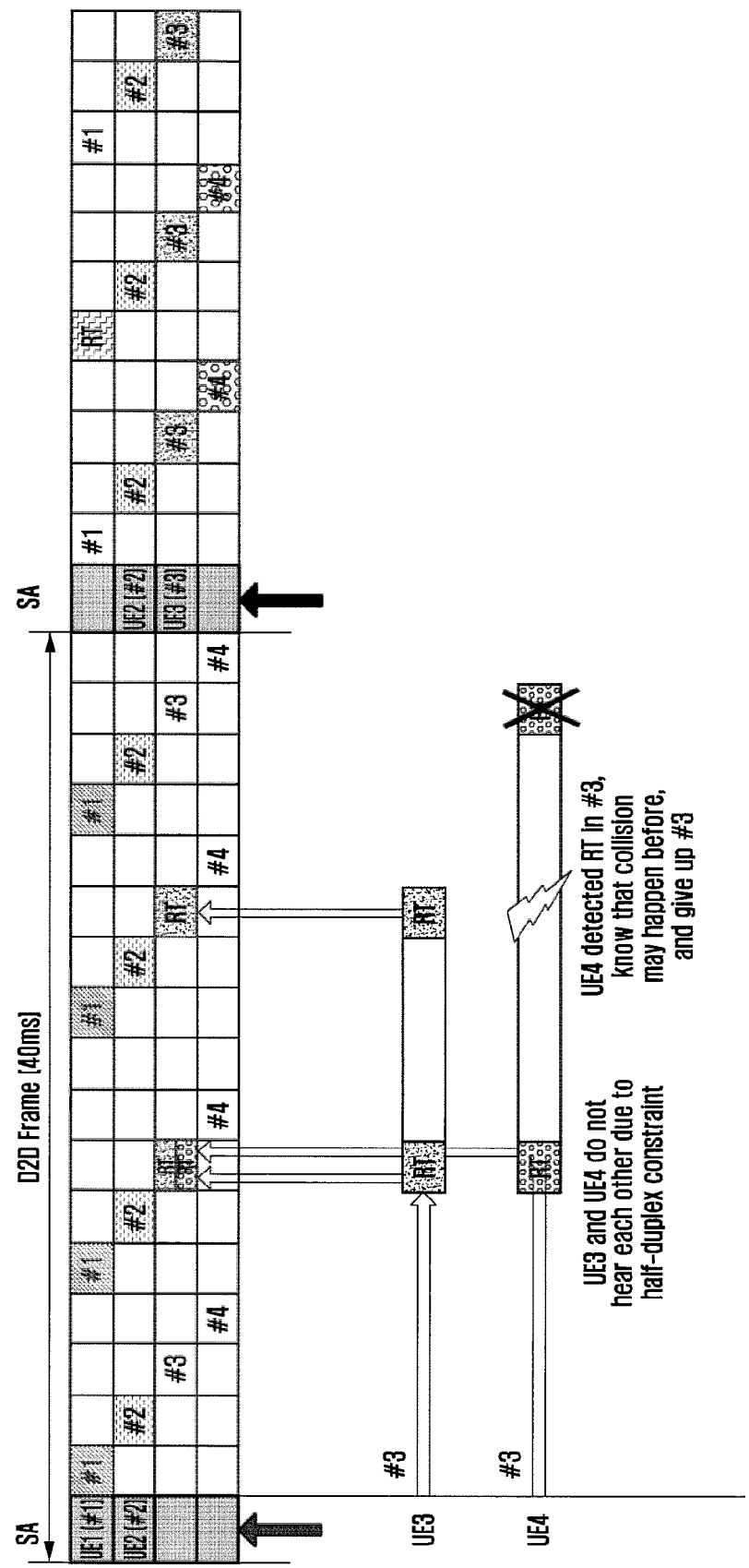
FIG. 15 illustrates a Reserve to Transmit (RT) transmission method according to various embodiments of the present disclosure.

FIG. 15 illustrates a Reserve to Transmit (RT) transmission method according to various embodiments of the present disclosure.

When the backoff timers of multiple sending UEs are set to the same value, the sending UEs transmit their RT signals on the same resource. When the RT signals of different UEs are transmitted on the same resource, the receiving UE fails to receive the RT signals correctly due to the collision. From the viewpoint of the sending UE, this causes a Half-Duplex problem in which one sending UE cannot receive the RT signals transmitted by other sending UEs on the same resource.

In order to mitigate such problems, the sending UEs transmit the RT signals in a pattern as shown in FIG. 15. The sending UEs transmit their RT signal at different intervals over a plurality of times. In certain embodiments, it is likely to difficult for the sending UEs to select the same backoff timer and same pattern, resulting in minimization of the collision probability.

Referring to FIG. 15, although their first RT signals collide on the same resource, since the RT signals of the UE3 and UE4 are transmitted at different intervals, the UE4 listens to the RT signal of the UE3.

The UE4 operates as described in the above embodiments. In FIG. 15, the RT signal includes a contention index such that the UE transmitting the RT signal with a high contention index, other than the UE transmitting the RT signal first, wins the contention.

In patterned-RT signal transmission for resolving contention with different time intervals, all RT signals, with the exception of the first RT signals, include the first RT signal timings or backoff timers. In the embodiment of FIG. 15, when the second packet of the UE3 is transmitted after a number of resource blocks corresponding to one backoff timer since the first packet, it include the value of −1. Another sending UE, which has received the RT signal of the UE3, checks the value of −1 and detects that the first RT signal is transmitted before one resource block.

The above embodiments are mainly directed to the operations between UEs without involvement of the network.

In the partial network coverage scenario, the UE which is allocated the resource from an eNB has a high priority as compared to the UE which selects the resource autonomously out of the eNB coverage. Accordingly, the intra-eNB UEs do not contend but transmits the SA signals on the resource allocated by the eNB. The out-of-coverage UEs first senses the SA signal to select resource and thus there is no problem. When the unoccupied resource is selected by (allocated to) the out-of-coverage UE, collision occur when the intra-eNB UE to attempt using the corresponding resource. In order to solve this problem, the intra-eNB UE transmits the RT signal to select the unoccupied resource. For example, the intra-eNB UE transmits the RT signal including the index and priority of the resource allocated by the eNB or information notifying that it is the intra-eNB UE. The intra-eNB UE transmits the RT signal with its backoff timer set to 0 under the assumption that the out-of-coverage UEs do not set their backoff timers to 0. When the intra-eNB UE wins the contention with the out-of-coverage UE and thus is allocated resource, it requests for withdrawal of the resource intended to use originally with the SA signal.

Figure 16:
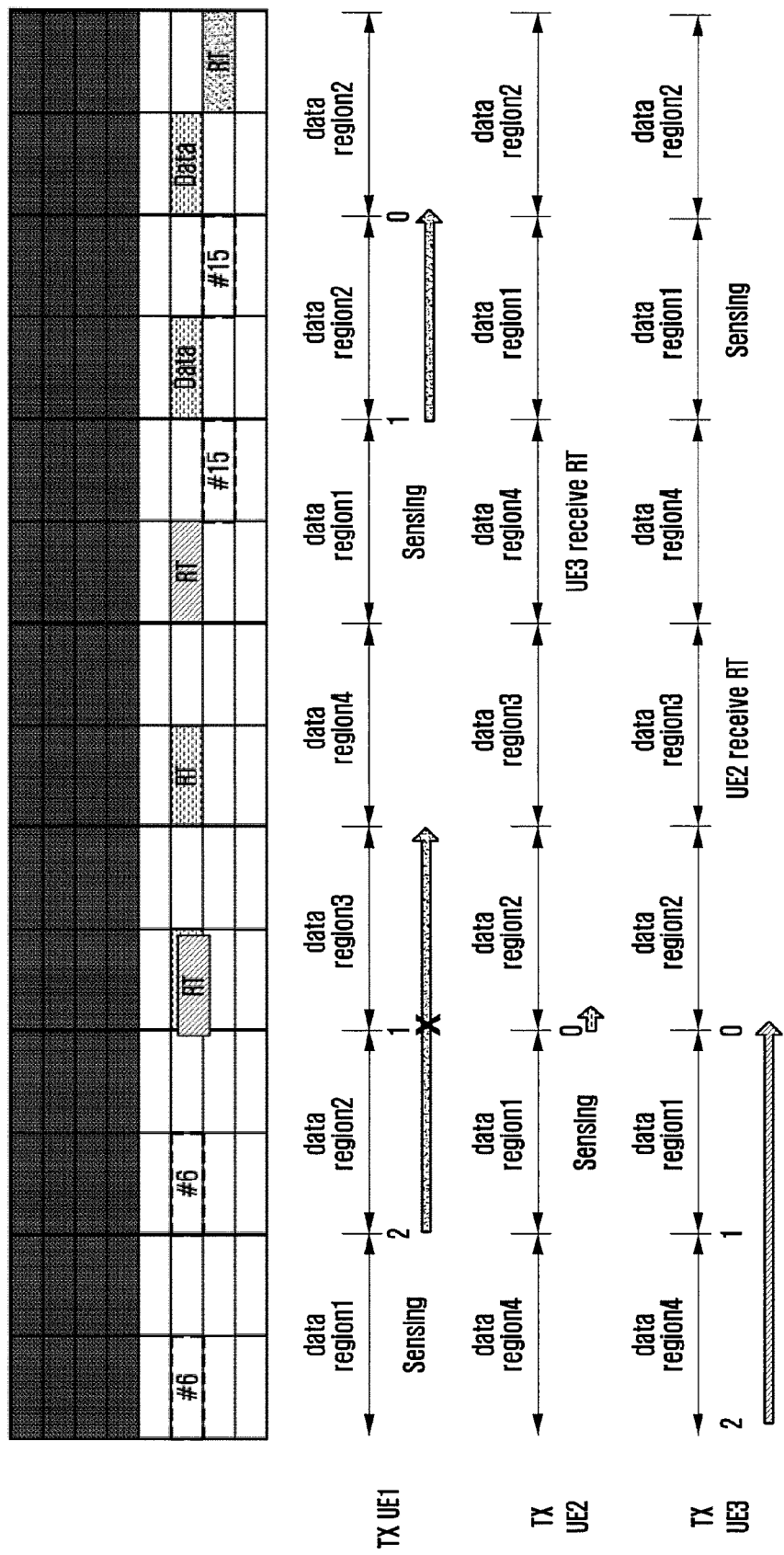
FIG. 16 illustrates an asynchronous D2D resource allocation method according to various embodiments of the present disclosure.

FIG. 16 illustrates an asynchronous D2D resource allocation method according to various embodiments of the present disclosure.

The UE1 performs sensing in the data region 1 to detect the unoccupied resource #6 and starts the backoff timer from 2. The UE2 and UE3 are synchronized in time. The UE2 performs sensing in the data region 1 and starts the backoff timer from 0 to transmit the RT signal in the next data region 2 immediately. The UE3, which a backoff timer is decreasing, transmits the RT signal when the backoff timer reaches 0 in the data region 2. When the consecutive RT signal patterns used by the UE2 and UE3 differ from each other, the UE3 receives the RT signal of the UE2 that is transmitted in the data region 3, gives up transmission in the resource #6 of the current repetitive period, and performs sensing in the data region 1 of the next repetitive period. The UE1 receives the RT signal of the UE2 or UE3, pauses the backoff operation for the corresponding resource #6, and performs sensing in the next repetitive period and restarts backoff operation in the unoccupied resource #15 to transmit the RT signal in the data region 2 at which the backoff has ended.

Although the above description is mainly directed to the SA and data resource allocation method using unoccupied resource, the SA resource allocation method in which the resource selection (resource allocation) is indicated directly in the SA transmission period (control region or first data region) be used in various embodiments. In certain embodiments, all of the UEs sense and decode all the SAs. When selecting the SA resource for transmitting the SA signal, the UE decodes the received SAs to check available SA resources. The UE selects one of the available SA resources to transmit the SA signal.

In certain embodiments, there is an SA reservation interval comprised of a plurality of SA periods for protecting against collision before SA signal transmission. The UE selects one SA period for transmitting the SA signal along with the selection indicator (reservation indicator) and informs that the corresponding SA resource is reserved for transmitting data after the end of the SA reservation interval. This information notifies other UEs that the corresponding SA resource is selected by the UE and other UEs cannot use the SA resource in order to avoid collision. When a UE detects the other UE's occupancy of the SA resource, it detects the invalidity of the corresponding SA resource and considers selecting one of other available SA resources.

Figure 18:
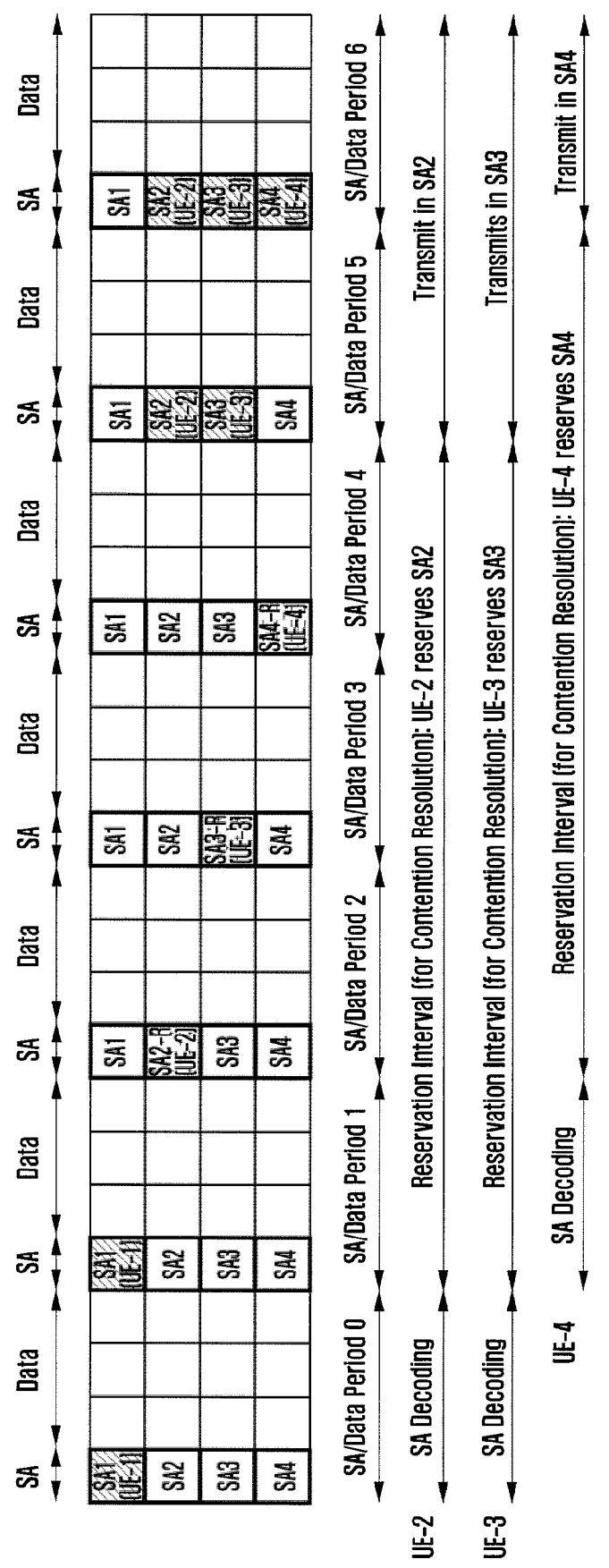
FIG. 18 illustrates a resource allocation method according to various embodiments of the present disclosure.

FIG. 18 illustrates a resource allocation method according to various embodiments of the present disclosure.

Referring to FIG. 18, the SA1 in the SA/data period 0 is used by the UE1.

When the SA/data period 0 arrives, the UE2 and UE3 perform decoding on the SA resource to detect SA2, SA3, and SA3 as available SA resources. During the SA reservation interval, the UE2 selects SA2 of the SA/data period 2, and the UE3 selects SA3 of the SA/data period 3.

When the SA/data period 1 arrives, the UE4 decodes the SA signal to detect the SA2, SA3, and SA4 as available SA resources. During the reservation interval, the UE4 decodes on SA2 and SA3 and the SA2 and SA3 are not selected. Finally, the UE4 selects SA4 of the SA/data period 4.

After the SA reservation interval, the UEs transmit SA signals on the selected SA resources without collision.

Figure 19:
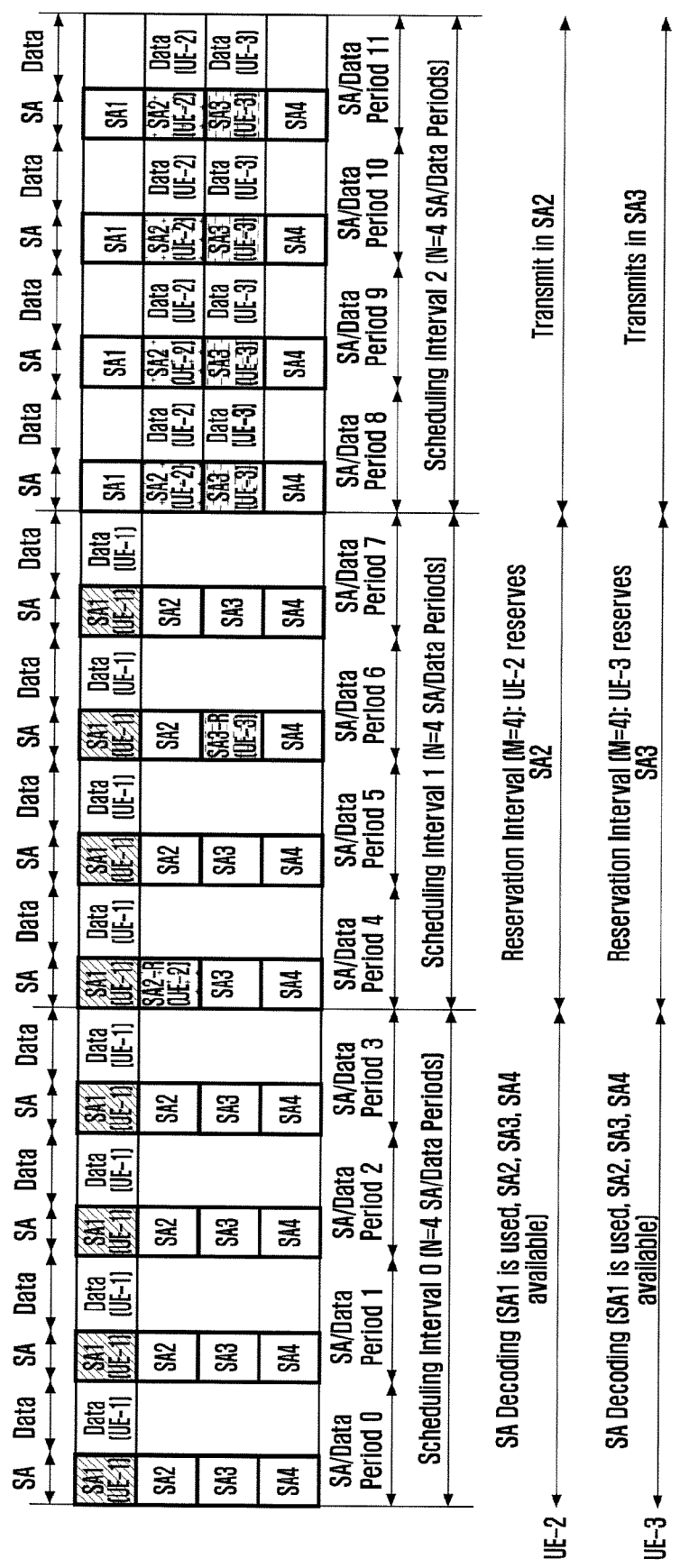
FIG. 19 illustrates a resource allocation method according to various embodiments of the present disclosure.

FIG. 19 illustrates a resource allocation method according to various embodiments of the present disclosure.

Referring to FIG. 19, the scheduling interval configured by the system consists of N SA/data periods. When the UE selects SA and data resource, it performs transmission in at least one scheduling interval. Each scheduling interval has a reservation interval that consists of M SA/data period. In certain embodiments, N and M are set through signaling with a System Information Block (SIB), and M is equal to or less than N.

In the embodiment of FIG. 19, the scheduling interval is equal in length to the reservation interval, and N=N=4. In the scheduling interval 0, the UE1 uses SA1. When the SA/data period 0 arrives, the UE2 and UE3 decode the received SA signal to detect the SA2, SA3, and SA4 are the available SA resources. In the next scheduling interval, the UE2 and UE3 select SA resources during the reservation interval. The UE2 selects the SA2 in the SA/data period 4, and the UE3 selects the SA3 in the SA/data period 6.

The UE transmits the SA reservation including the information on the selected SA resource. Before the end of the reservation interval after transmitting the SA reservation in the current SA/data period, the UE transmits the SA reservation repeatedly in the SA/data period. For example, the UE2 transmits the SA reservation in the SA/data periods 4, 5, 6, and 7; and the UE3 transmits the SA reservation in the SA/data periods 6 and 7. Upon detection of the SA reservation, the other UEs do not select the reserved SA resources to avoid collision.

According to the above embodiment, the UE2 and UE3 transmit SA signals on the selected SA resources respectively in the subsequent scheduling intervals without collision.

A description is made of the SA reservation indication method hereinafter in detail.

The SA signal includes important information as listed in Table 1.

TABLE 1

| SA Field Name | Length | Usage |
| --- | --- | --- |
| ID | 8 | RX (Group) ID and/or TX ID |
| Data Resource Frequency Index | 5~13 | Data Resource RB Index (BW dependent) |
| Data Resource Time Index | 7 | Data Resource Sub-frame Index |
| MCS and RV | 5 | Common for all TBs |
| TX Timing Information | 6 | Timing advance (TA) value is indicated |
| Flag for SPS Indication | 1 | SPS or not |
| TPC indication | 1 | Power control information |
| Indication of SA Reservation | 1 | Indicate that this SA is only reservation or for data transmission |

In various embodiments of the present disclosure, both the explicit indication method and implicit indication method are used.

Option 1: Explicit Indication

The simplest explicit indication method is to include an indication parameter in the SA signal explicitly. As shown in table 1, the '1-bit Indication of SA reservation' field indicates that the SA resource is selected for data transmission explicitly. In certain embodiments, other fields are reused for transmitting other useful information. For example, other field contains the selected data resource and selected length for the data transmission such that other UEs do not select the corresponding data resource during the selected length.

Option 2: Implicit Indication

In various embodiments, it is possible to indicate that the SA resource is reserved for data transmission in various ways instead of using the 1-bit indicator. A few fields are set to specific values for indicating the reservation of the SA resource. For example, the 'ID' field is set to '00000000' to indicate the SA resource reservation. The 'MCS and RV' field is set to '11111' to indicate the SA resource reservation. The 'ID' field and 'MCS and RV' field are set to '00000000' and '11111' respectively to indicate the SA resource reservation in combination. It is also possible to set other fields to predetermined values to indicate the SA resource reservation. The SA resource reservation is indicated implicitly without use of the 1-bit indicator.

Figure 17:
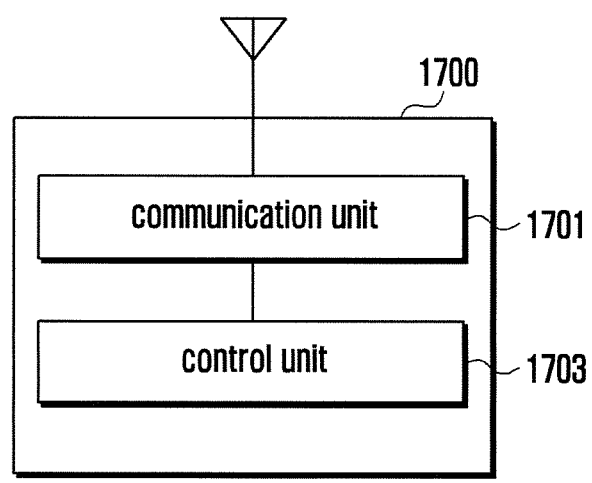
FIG. 17 illustrates a configuration of the UE according to various embodiments of the present disclosure.

FIG. 17 illustrates a configuration of the UE according to various embodiments of the present disclosure.

Referring to FIG. 17, the UE 1700 according to certain embodiments of the present disclosure includes a communication unit 1701 and a control unit 1703.

The communication unit 1701 is responsible for data communication. For example, the communication unit 1701 transmits the control signal such as SA and RT signals and D2D broadcast data. The communication unit 1701 also monitors the media to receive the control signals of other UEs.

The control unit 1703 controls the components of the UE 1700 for D2D communication. The control unit 1703 controls the components including the communication unit 1701 to perform the resource allocation operation according to certain embodiments of the present disclosure. The control unit 1703 operates as described above.

As described above, the resource allocation method of the present disclosure is advantageous in terms of protecting against collision among transmitting terminals and decreases resource access delay in allocating resources for D2D broadcast among the terminals out of the network coverage or in the partial network coverage.

Also, the resource allocation method of the present disclosure is advantageous in that the terminal allocated resource previously is not affected by the newly entered terminal and can yield the resource to the newly entered terminal when the terminals have different priorities.

It is to be appreciated that those skilled in the art can change or modify the embodiments without departing the technical concept of this disclosure. Accordingly, it should be understood that above-described embodiments are essentially for illustrative purpose only but not in any way for restriction thereto.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A resource allocation method of a device-to-device (D2D) terminal, the method comprising:
   receiving a control signal in a first region of a frame;
   identifying an available resource in a second region of the frame based on the control signal;
   monitoring to detect that a signal is received on the available resource while a backoff timer is running; and
   performing, when no signal is received on the available resource before expiry of the backoff timer, a D2D communication using the available resource.

2. The method of claim 1, further comprising skipping, when a signal is received on the available resource before expiry of the backoff timer, the D2D communication using the available resource.

3. The method of claim 1, further comprising:
   determining, when a signal is received on the available resource before expiry of the backoff timer, whether additional available resources exist in the frame;
   selecting, when additional available resources exist in the frame, one of the additional available resources; and
   performing, when no signal is received on the available resource before expiry of the backoff timer, the D2D communication using the available resource in a next frame.

4. The method of claim 3, further comprising skipping, when no additional available resources exist in the frame, the D2D communication using the available resource in the frame.

5. The method of claim 1, further comprising:
   removing, when the signal is received before expiry of the backoff timer, the available resource corresponding to the signal from an available resource list;
   determining, when the backoff timer expires, whether the available resource remains in the available resource list; and
   performing, when the available resource remains in the available resource list, the D2D communication using the available resource.

6. The method of claim 1, wherein identifying the available resource comprises:
   selecting at least part of the available resource.

7. The method of claim 1, wherein performing the D2D communication comprises transmitting, when the signal is not received on the available resource before expiry of the backoff timer, a transmission reservation signal on the available resource.

8. The method of claim 7, wherein transmitting the transmission reservation signal comprises transmitting the transmission reservation signal in a transmission pattern formed based on a transmission interval and a number of timers.

9. The method of claim 1, wherein the backoff timer decreases by one per available resource block or subframe.

10. A terminal operating in device-to-device (D2D) communication mode, the terminal comprising:
    a communication unit configured for data communication; and
    a control unit configured to:
        receive a control signal in a first region of a frame;
        identify an available resource in a second region of the frame based on the control signal;
        monitor to detect that a signal is received on the available resource while a backoff timer is running; and
        control the communication unit to perform, when no signal is received on the available resource before expiry of the backoff timer, a D2D communication using the available resource.

11. The terminal of claim 10, wherein the control unit is further configured to skip, when a signal is received on the available resource before expiry of the backoff timer, the D2D communication using the available resource.

12. The terminal of claim 10, wherein the control unit is further configured to:

determine, when a signal is received on the available resource before expiry of the backoff timer, whether additional available resources exist in the frame;

select, when additional available resources exist in the frame, one of the additional available resources; and control the communication unit to perform, when no signal is received on the available resource before expiry of the backoff timer, the D2D communication using the available resource in a next frame.

13. The terminal of claim 12, wherein the control unit is further configured to skip, when no additional available resources exist in the frame, the D2D communication using the available resource in the frame.

14. The terminal of claim 10, wherein the control unit is further configured to:

remove, when the signal is received before expiry of the backoff timer, the available resource corresponding to the signal from an available resource list;

determine, when the backoff timer expires, whether the available resource remains in the available resource list; and control the communication unit to perform, when the available resource remains in the available resource list, the D2D communication using the available resource.

15. The terminal of claim 10, wherein the control unit is further configured to:

select at least part of the available resource.

16. The terminal of claim 10, wherein the control unit is further configured to control the communication unit to perform the D2D communication comprises transmitting, when the signal is not received on the available resource before expiry of the backoff timer, a transmission reservation signal on the available resource.

17. The terminal of claim 16, wherein the control unit is further configured to control the communication unit to transmit the transmission reservation signal in a transmission pattern formed based on a transmission interval and a number of timers.

18. The terminal of claim 10, wherein the backoff timer decreases by one per available resource block or subframe.

* * * * *